US009942551B2

(12) United States Patent
Karczewicz et al.

(10) Patent No.: US 9,942,551 B2
(45) Date of Patent: Apr. 10, 2018

(54) PALETTE INDEX GROUPING FOR VIDEO CODING

(71) Applicant: QUALCOMM Incorporated, San Diego, CA (US)

(72) Inventors: Marta Karczewicz, San Diego, CA (US); Wei Pu, Pittsburgh, PA (US); Rajan Laxman Joshi, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 15/009,477

(22) Filed: Jan. 28, 2016

(65) Prior Publication Data

US 2016/0227217 A1    Aug. 4, 2016

Related U.S. Application Data

(60) Provisional application No. 62/110,302, filed on Jan. 30, 2015.

(51) Int. Cl.
*H04N 19/33* (2014.01)
*H04N 19/13* (2014.01)
(Continued)

(52) U.S. Cl.
CPC ........... *H04N 19/13* (2014.11); *H04N 19/105* (2014.11); *H04N 19/117* (2014.11);
(Continued)

(58) Field of Classification Search
CPC .. H04N 19/105; H04N 19/117; H04N 19/124; H04N 19/13; H04N 19/136;
(Continued)

(56) References Cited

U.S. PATENT DOCUMENTS 8,085,844 B2 * 12/2011 Holcomb .............. H04N 19/70
375/240.12
9,544,607 B2 * 1/2017 Lai ...................... H04N 19/176
(Continued)

FOREIGN PATENT DOCUMENTS

WO    WO 2016127889 A1 *  8/2016  ............. H04N 19/93
WO    WO-2016127889 A1 *  8/2016  ............. H04N 19/93

OTHER PUBLICATIONS

Ye et al, Parallel Palette Mode Decoding for HEVC SCC, 2016.*
(Continued)

*Primary Examiner* — Shan E Elahi

(57) ABSTRACT

In an example, a method of decoding video data may include receiving a palette mode encoded block of video data of a picture. The method may include receiving encoded palette mode information for the palette mode encoded block of video data. The encoded palette mode information may include a plurality of instances of a first syntax element and a plurality of syntax elements that are different from the first syntax element. The method may include decoding, using bypass mode, the plurality of instances of the first syntax element before decoding the plurality of syntax elements that are different from the first syntax element using context mode. The method may include decoding, using context mode, the plurality of syntax elements that are different from the first syntax element after decoding the plurality of instances of the first syntax element using bypass mode.

42 Claims, 9 Drawing Sheets

(51) Int. Cl.

| | |
|---|---|
| H04N 19/70 | (2014.01) |
| H04N 19/593 | (2014.01) |
| H04N 19/463 | (2014.01) |
| H04N 19/42 | (2014.01) |
| H04N 19/105 | (2014.01) |
| H04N 19/117 | (2014.01) |
| H04N 19/124 | (2014.01) |
| H04N 19/136 | (2014.01) |
| H04N 19/176 | (2014.01) |
| H04N 19/186 | (2014.01) |
| H04N 19/44 | (2014.01) |
| H04N 19/52 | (2014.01) |
| H04N 19/93 | (2014.01) |

(52) U.S. Cl.
CPC ......... *H04N 19/124* (2014.11); *H04N 19/136* (2014.11); *H04N 19/176* (2014.11); *H04N 19/186* (2014.11); *H04N 19/42* (2014.11); *H04N 19/44* (2014.11); *H04N 19/463* (2014.11); *H04N 19/52* (2014.11); *H04N 19/593* (2014.11); *H04N 19/70* (2014.11); *H04N 19/93* (2014.11)

(58) Field of Classification Search
CPC .... H04N 19/176; H04N 19/186; H04N 19/42; H04N 19/44; H04N 19/463; H04N 19/52; H04N 19/593; H04N 19/70; H04N 19/93
USPC ...................................... 375/240.02
See application file for complete search history.

(56) References Cited

U.S. PATENT DOCUMENTS

| | | | | |
|---|---|---|---|---|
| 2006/0126744 A1* | 6/2006 | Peng | ......... | H03M 7/4006 375/240.26 |
| 2007/0296613 A1* | 12/2007 | Hussain | ......... | H04N 19/61 341/50 |
| 2014/0140400 A1* | 5/2014 | George | ......... | H04N 19/52 375/240.12 |
| 2014/0328396 A1* | 11/2014 | Guo | ......... | H04N 19/70 375/240.03 |
| 2015/0098513 A1* | 4/2015 | Fu | ......... | H04N 19/91 375/240.25 |
| 2015/0172678 A1* | 6/2015 | Alshina | ......... | H04N 19/86 375/240.02 |
| 2015/0181251 A1* | 6/2015 | Alshina | ......... | H04N 19/86 375/240.24 |
| 2015/0181252 A1* | 6/2015 | Alshina | ......... | H04N 19/86 375/240.24 |
| 2015/0186100 A1* | 7/2015 | Tsai | ......... | G06F 3/1454 375/240.12 |
| 2015/0189284 A1* | 7/2015 | Alshina | ......... | H04N 19/86 375/240.02 |
| 2015/0189330 A1* | 7/2015 | Alshina | ......... | H04N 19/86 375/240.24 |
| 2015/0264365 A1* | 9/2015 | Tsai | ......... | H04N 19/94 375/240.03 |
| 2015/0341655 A1* | 11/2015 | Joshi | ......... | H04N 19/70 375/240.16 |
| 2015/0341660 A1* | 11/2015 | Joshi | ......... | H04N 19/583 375/240.03 |
| 2015/0341673 A1* | 11/2015 | Joshi | ......... | H04N 19/70 375/240.12 |
| 2015/0373325 A1* | 12/2015 | Karczewicz | ......... | H04N 19/593 375/240.13 |
| 2016/0057434 A1* | 2/2016 | Lai | ......... | H04N 19/176 382/233 |
| 2016/0100177 A1* | 4/2016 | Pu | ......... | H04N 19/94 375/240.24 |
| 2016/0212446 A1* | 7/2016 | Liu | ......... | H04N 19/597 |
| 2016/0227239 A1* | 8/2016 | Pu | ......... | H04N 19/593 |
| 2016/0323594 A1* | 11/2016 | Sun | ......... | H04N 19/176 |
| 2016/0345030 A1* | 11/2016 | Karczewicz | ......... | H04N 19/176 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16);JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16);JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16);JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16);JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16);JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Joshi et al., "High Efficiency Video Coding (HEVC) Screen Content Coding: Draft 2", 18th Meeting, Jun. 30 through Jul. 9, 2014, Sapporo, JP; (Joint Collaborative Team on Video Coding (JCT-VC) of ITU-T SG 16 WP 3 and ISO/IEC JTC1/SC 29/WG 11), JCTVC-S1005, Dec. 10, 2014, 374 pp.

(56) References Cited

OTHER PUBLICATIONS

Marpe et al., "Context-based adaptive binary arithmetic coding in the H.264/AVC video compression standard," in IEEE Trans. Cir. & Sys. Video Tech., vol. 13, No. 7, Jul. 2003, 17 pp.
Pu et al., "AHG10: Suggested Software for Palette Coding based on RExt6.0", 17th Meeting, Mar. 27-Apr. 4, 2014, Valencia, ES; (Joint Collaborative Team on Video Coding (JCT-VC) of ITU-T SG16 WP3 and ISO/IEC JTC1/SC29/WG11), JCTVC-Q0094, Mar. 19, 2014, 4 pp.
Kim et al., "CE6-related : Enabling copy above mode prediction at the boundary of CU", 19th Meeting, Oct. 17-24, 2014, Strasbourg, FR; (Joint Collaborative Team on Video Coding (JCT-VC) of ITU-T SG16 WP3 and ISO/IEC JTC1/SC29/WG11), JCTVC-S0114, Oct. 18, 2014, 7 pp.
Ye et al., "Non CE6: Copy previous mode", 19th Meeting, Oct. 17-24, 2014, Strasbourg, FR; (Joint Collaborative Team on Video Coding (JCT-VC) of ITU-T SG16 WP3 and ISO/IEC JTC1/SC29/WG11), JCTVC-S0120, Oct. 17, 2014, 7 pp.
Wang et al., "Non-CE6: 2-D Index Map Coding of Palette Mode in HEVC SCC", 19th Meeting, Oct. 17-24, 2014, Strasbourg, FR; (Joint Collaborative Team on Video Coding (JCT-VC) of ITU-T SG16 WP3 and ISO/IEC JTC1/SC29/WG11), JCTVC-S0151, Oct. 17, 2014, 6 pp.
Wang et al., "Non-CE6: 2-D Index Map Coding of Palette Mode in HEVC SCC", Powerpoint Presentation, 19th Meeting, Oct. 17-24, 2014, Strasbourg, FR; (Joint Collaborative Team on Video Coding (JCT-VC) of ITU-T SG16 WP3 and ISO/IEC JTC1/SC29/WG11), JCTVC-S0151, Oct. 17, 2014, 11 pp.
International Search Report and Written Opinion from International Application No. PCT/US2016/015663, dated Apr. 20, 2016, 13 pp.

Chen et al, "Description of screen content coding technology proposal by Qualconm" , 17th Meeting; Mar. 27-Apr. 4, 2014;Valencia, ES; (Joint Collaborative Team on Video Coding of ISO/IEC JTC1/SC29/WG11 and ITU-T SG. 16) ; URL: http://wftp3.itu.int/av-arch/jctvc-site/ , No. JCTVC-Q0031-v3, Mar. 28, 2014 , XP030115916, 19 pp.
Sze et al., "High Efficiency Video Coding (HEVC) : Algorithms and Architectures—Chapter 8: Entropy Coding in HEVC" In: "High Efficiency Video Coding (HEVC) : Algorithms and Architectures—Chapter 8: Entropy Coding in HEVC", Jan. 1, 2014, Springer International Publishing, XP55263413, ISBN: 978-3-319-06894-7 pp. 209-269, 61 pp.
Karczewicz et al., "Non CE1: Grouping Palette Indices at Front", JCT-VC Meeting; Feb. 10-18, 2015; Geneva; CH (Joint Collaborative Team on VID EO Coding of ISO / IEC JTC1/SC29/WG11 and ITU-T SG. 16 ); URL: http: / /wftp3.itu.int/av-arch/jctvc-site/ ., No. JCTVC-T0065r2, Feb. 11, 2015, XP030117191, 3 pp.
Joshi, et al. "Screen Content Coding Test Model 4 Encoder Description (SCM 4)", JCT-VC Meeting; Feb. 10-18, 2015; Geneva, CH; (Joint Collaborative Team on Video Coding of ISO / IEC JTC1/SC29/WG11 and ITU-T SG. 16 ); URL: http:/ / wft p3.itu.int/av-arch/jc tvc-site/ ., No. JCTVC-T1014, Jun. 1, 2015, XP030117420, 12 pp.
International Preliminary Report on Patentability issued in International Application No. PCT/2016/015663 dated Apr. 28, 2017, 13 pp.
Response to Written Opinion dated Apr. 20, 2016, for International Application No. PCT/US2016/015663, filed Nov. 29, 2016, 11 pp.
Second Written Opinion for International Application No. PCT/US2016/015663, dated Jan. 31, 2017, 7 pp.

\* cited by examiner

| | |
|---|---|
| ... | |
| if( currentPaletteSize != 0 ) | |
|     palette_escape_val_present_flag | ae(v) |
|     indices_idc_coding() (Relocate all occurrence of palette_index_idc to here) | |
|     if( palette_escape_val_present_flag ) { | |
|         if( cu_qp_delta_enabled_flag && !IsCuQpDeltaCoded ) { | |
|             cu_qp_delta_palette_abs | ae(v) |
|             if( cu_qp_delta_palette_abs ) | |
|             cu_qp_delta_palette_sign_flag | ae(v) |
|         } | |
|         if( cu_chroma_qp_offset_enabled_flag && !IsCuChromaQpOffsetCoded ) { | |
|             cu_chroma_qp_palette_offset_flag | ae(v) |
|             if( cu_chroma_qp_offset_flag && chroma_qp_offset_list_len_minus1 > 0 ) | |
|             cu_chroma_qp_palette_offset_idx | ae(v) |
|         } | |
|     } | |
|     if( indexMax > 0) | |
|         palette_transpose_flag | ae(v) |
|     scanPos = 0 | |
|     while( scanPos < nCbS * nCbS ) { | |
|         ... | |
|         if( palette_run_type_flag[ xC ][ yC ] == COPY_INDEX_MODE && adjustedIndexMax > 0) | |
|             palette_index_idc | ae(v) |
|         if( indexMax > 0 ) { | |
|             maxPaletteRun = nCbS * nCbS - scanPos - 1 | |
|         if( maxPaletteRun > 0 ) { | |
|             palette_run_msb_id_plus1 | ae(v) |
|             if( palette_run_msb_id_plus1 > 1 ) | |
|             palette_run_refinement_bits | ae(v) |
|         } | |
|     } else | |
|     ... | |

FIG. 7

PALETTE INDEX GROUPING FOR VIDEO CODING

This application claims the benefit of U.S. Provisional Patent Application No. 62/110,302 filed on Jan. 30, 2015, which is hereby incorporated by reference herein in its entirety.

TECHNICAL FIELD

This disclosure relates to encoding and decoding content, and more specifically, encoding and decoding content according to a palette-based coding mode.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

Content, such as an image, may be encoded and decoded using palette mode. Generally, palette mode is a technique involving use of a palette to represent content. Content may be encoded such that the content is represented by an index map that includes values corresponding to the palette. The index map may be decoded to reconstruct the content.

SUMMARY

Techniques of this disclosure relate to palette-based content coding. For example, in palette-based content coding, a content coder (e.g., a content coder such as a video encoder or a video decoder) may form a "palette" as a table of colors for representing the video data of the particular area (e.g., a given block). Palette-based content coding may, for example, be especially useful for coding areas of video data having a relatively small number of colors. Rather than coding actual pixel values (or their residuals), the content coder may code palette indices (e.g., index values) for one or more of the pixels that relate the pixels with entries in the palette representing the colors of the pixels. The techniques described in this disclosure may include techniques for various combinations of one or more of signaling palette-based coding modes, transmitting palettes, deriving palettes, deriving the value of non-transmitted syntax elements, transmitting palette-based coding maps and other syntax elements, predicting palette entries, coding runs of palette indices, entropy coding palette information, and various other palette coding techniques.

In one example, this disclosure describes a method of decoding video data comprising receiving, from an encoded video bitstream, a palette mode encoded block of video data of a picture; receiving, from the encoded video bitstream, encoded palette mode information for the palette mode encoded block of video data, wherein the encoded palette mode information includes a plurality of instances of a first syntax element and a plurality of syntax elements that are different from the first syntax element; decoding, using bypass mode, the plurality of instances of the first syntax element before decoding the plurality of syntax elements that are different from the first syntax element using context mode; decoding, using context mode, the plurality of syntax elements that are different from the first syntax element after decoding the plurality of instances of the first syntax element using bypass mode; and decoding the palette mode encoded block of video data using the decoded plurality of instances of the first syntax element and the decoded plurality of syntax elements that are different from the first syntax element.

In another example, this disclosure describes a device for decoding video data comprising a memory configured to store the video data; and a video decoder in communication with the memory configured to: receive, from an encoded video bitstream, a palette mode encoded block of video data of a picture; receive, from the encoded video bitstream, encoded palette mode information for the palette mode encoded block of video data, wherein the encoded palette mode information includes a plurality of instances of a first syntax element and a plurality of syntax elements that are different from the first syntax element; decode, using bypass mode, the plurality of instances of the first syntax element before decoding the plurality of syntax elements that are different from the first syntax element using context mode; decode, using context mode, the plurality of syntax elements that are different from the first syntax element after decoding the plurality of instances of the first syntax element using bypass mode; and decode the palette mode encoded block of video data using the decoded plurality of instances of the first syntax element and the decoded plurality of syntax elements that are different from the first syntax element.

In another example, this disclosure describes a non-transitory computer-readable storage medium having instructions stored thereon that, when executed, cause one or more processors to receive, from an encoded video bitstream, a palette mode encoded block of video data of a picture; receive, from the encoded video bitstream, encoded palette mode information for the palette mode encoded block of video data, wherein the encoded palette mode information includes a plurality of instances of a first syntax element and a plurality of syntax elements that are different from the first syntax element; decode, using bypass mode, the plurality of instances of the first syntax element before decoding the plurality of syntax elements that are different from the first syntax element using context mode; decode, using context mode, the plurality of syntax elements that are different from the first syntax element after decoding the plurality of instances of the first syntax element using bypass mode; and decode the palette mode encoded block of video data using the decoded plurality of instances of the first syntax element and the decoded plurality of syntax elements that are different from the first syntax element.

In another example, this disclosure describes a method of encoding video data comprising determining that a block of video data is to be coded in palette mode; encoding the block of video data using palette mode into an encoded bitstream, wherein encoding the block of video data using palette mode comprises: generating palette mode information for the block of video data, wherein the palette mode information includes a plurality of instances of a first syntax element and a plurality of syntax elements that are different from the first syntax element; encoding, using bypass mode, the plurality of instances of the first syntax element into the encoded bitstream before encoding the plurality of syntax elements that are different from the first syntax element into the encoded bitstream using context mode; and encoding, using context mode, the plurality of syntax elements that are different from the first syntax element into the encoded bitstream after encoding the plurality of instances of the first syntax element using bypass mode into the encoded bitstream.

In another example, this disclosure describes a device for encoding video data, the device comprising a memory configured to store the video data and a video encoder in communication with the memory, the video encoder configured to: determine that a block of video data stored in the memory is to be encoded in palette mode; encode the block of video data using palette mode into an encoded bitstream, wherein the video encoder being configured to encode the block of video data using palette mode comprises the video encoder being configured to: generate palette mode information for the block of video data, wherein the palette mode information includes a plurality of instances of a first syntax element and a plurality of syntax elements that are different from the first syntax element; encode, using bypass mode, the plurality of instances of the first syntax element into the encoded bitstream before encoding the plurality of syntax elements that are different from the first syntax element into the encoded bitstream using context mode; and encode, using context mode, the plurality of syntax elements that are different from the first syntax element into the encoded bitstream after encoding the plurality of instances of the first syntax element using bypass mode into the encoded bitstream.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a table illustrating changes to coding order of syntax elements for palette-mode.

DETAILED DESCRIPTION

Figure 1:
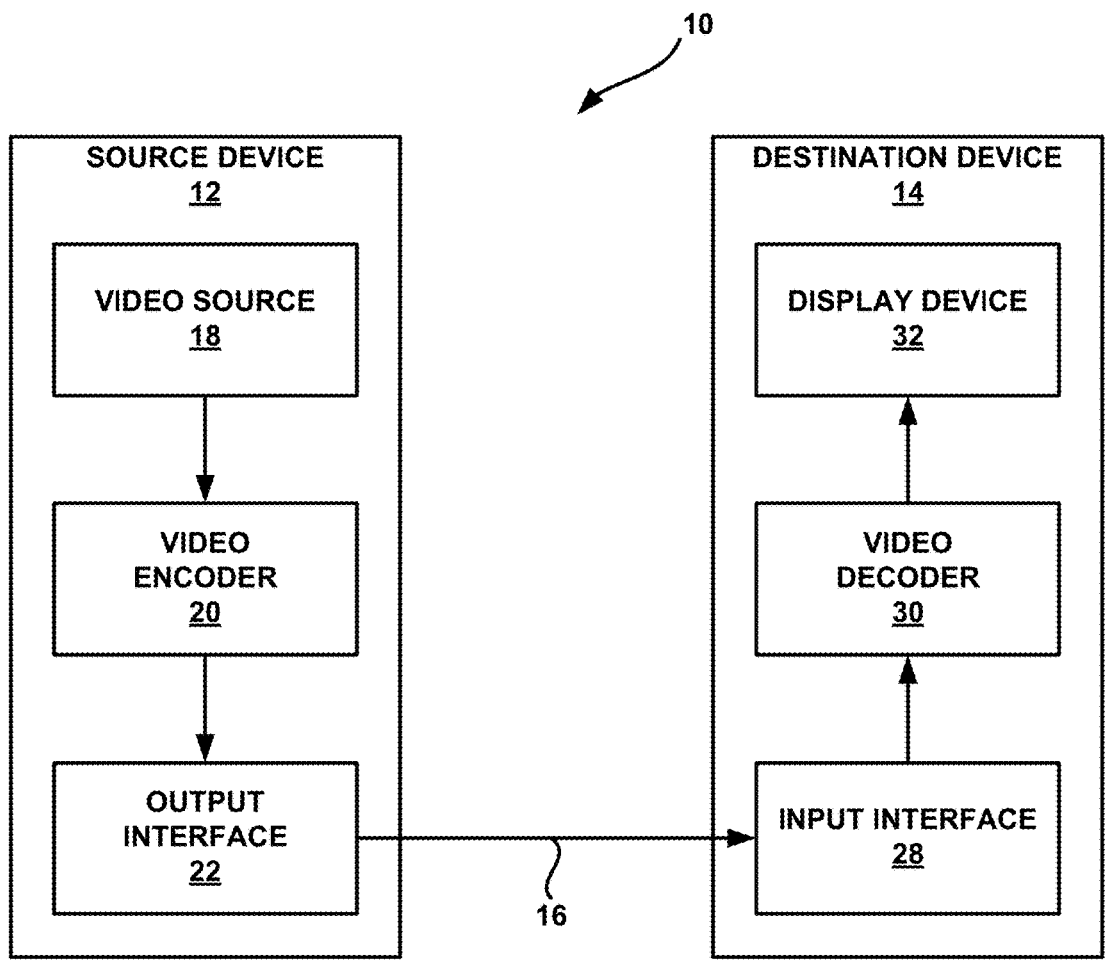
FIG. 1 is a block diagram illustrating an example video coding system that may utilize the techniques described in this disclosure.

Aspects of this disclosure are directed to techniques for content coding (e.g., video coding). In particular, this disclosure describes techniques for palette-based coding of content data (e.g., video data) and techniques for context-based adaptive binary arithmetic coding (CABAC) of palette coding information. In various examples of this disclosure, techniques of this disclosure may be directed to processes of predicting or coding a block in palette mode to improve coding efficiency and/or reduce codec complexity, as described in greater detail below. For example, the disclosure describes techniques related to palette index grouping (such as advanced palette index grouping).

In a CABAC process, e.g., as described in D. Marpe, H. Schwarz, and T. Wiegand, "Context-based adaptive binary arithmetic coding in the H.264/AVC video compression standard," in *IEEE Trans. Cir. & Sys. Video Tech.*, Vol. 13, No. 7, July 2003, there are two modes: (1) bypass mode and (2) context mode. In bypass mode, there is no context update process. Therefore, bypass mode can achieve higher data throughput than context-based mode by exploiting hardware or ISA level parallelism. This benefit of bypass mode becomes larger as the number of bypass bins that can be processed together increases.

In a current palette mode coding design, as described in R. Joshi and J. Xu, "High efficient video coding (HEVC) screen content coding: Draft 2," JCTVC-S1005, in screen content coding, the syntax elements of palette_index_idc and palette_escape_val are CABAC bypass mode coded, and are interleaved with other syntax elements such as palette_run_msb_id_plus1 which are CABAC context mode coded. This disclosure describes techniques of grouping the bypass mode coded syntax elements together. As used herein, "bypass mode coded" and "context mode coded" are respectively interchangeable with "bypass coded" and "context coded."

As used herein, instances of the term "content" may be changed to the term "video," and instances of the term "video" may be changed to the term "content." This is true regardless of whether the terms "content" or "video" are being used as an adjective, noun, or other part of speech. For example, reference to a "content coder" also includes reference to a "video coder," and reference to a "video coder" also includes reference to a "content coder." Similarly, reference to "content" also includes reference to "video," and reference to "video" also includes reference to "content."

As used herein, "content" refers to any type of content. For example, "content" may refer to video, screen content, image, any graphical content, any displayable content, or any data corresponding thereto (e.g., video data, screen content data, image data, graphical content data, displayable content data, and the like).

As used herein, the term "video" may refer to screen content, movable content, a plurality of images that may be presented in a sequence, or any data corresponding thereto (e.g., screen content data, movable content data, video data, image data, and the like).

As used herein, the term "image" may refer to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, image data, graphical data, and the like.

In traditional video coding, images are assumed to be continuous-tone and spatially smooth. Based on these assumptions, various tools have been developed such as block-based transforms, filtering, and other coding tools, and such tools have shown good performance for natural content videos. However, in applications like remote desktop, collaborative work and wireless display, computer-generated screen content may be the dominant content to be compressed. This type of screen content tends to have discrete-tone, sharp lines, and high contrast object boundaries. The assumption of continuous-tone and smoothness may no longer apply, and thus, traditional video coding techniques may be inefficient in compressing content (e.g., screen content).

In one example of palette-based video coding, a video encoder may encode a block of video data by determining a palette for the block (e.g., coding the palette explicitly, predicting the palette, or a combination thereof), locating an entry in the palette to represent the value(s) of one or more pixels, and encoding both the palette and the block with index values that indicate the entry in the palette used to represent the pixel values of the block. In some examples, the video encoder may signal the palette and/or the index values in an encoded bitstream. In turn, a video decoder may obtain, from an encoded bitstream, a palette for a block, as well as index values for the individual pixels of the block. The video decoder may relate the index values of the pixels to entries of the palette to reconstruct the various pixel values of the block.

For example, a particular area of video data may be assumed to have a relatively small number of colors. A video coder (e.g., a video encoder or video decoder) may code (e.g., encode or decode) a so-called "palette" to represent the video data of the particular area. The palette may be expressed as an index (e.g., table) of colors or pixel values representing the video data of the particular area (e.g., a given block). The video coder may code the index, which relates one or more pixel values to the appropriate value in the palette. Each pixel may be associated with an entry in the palette that represents the color of the pixel. For example, the palette may include the most dominant pixel values in the given block. In some cases, the most dominant pixel values may include the one or more pixel values that occur most frequently within the block. Additionally, in some cases, a video coder may apply a threshold value to determine whether a pixel value is to be included as one of the most dominant pixel values in the block. According to various aspects of palette-based coding, the video coder may code index values indicative of one or more of the pixels values of the current block, instead of coding actual pixel values or their residuals for a current block of video data. In the context of palette-based coding, the index values indicate respective entries in the palette that are used to represent individual pixel values of the current block. The description above is intended to provide a general description of palette-based video coding.

Palette-based coding may be particularly suitable for screen generated content coding or other content where one or more traditional coding tools are inefficient. The techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In some examples, the palette-based coding techniques may be configured for use with one or more video coding standards. For example, High Efficiency Video Coding (HEVC) is a new video coding standard being developed by the Joint Collaboration Team on Video Coding (JCT-VC) of ITU-T Video Coding Experts Group (VCEG) and ISO/IEC Motion Picture Experts Group (MPEG). The finalized HEVC standard document is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013.

To provide more efficient coding of screen generated content, the JCT-VC is developing an extension to the HEVC standard, referred to as the HEVC Screen Content Coding (SCC) standard. A recent working draft of the HEVC SCC standard, referred to as "HEVC SCC Draft 2" or "WD2," is described in document JCTVC-S1005, R. Joshi and J. Xu, "HEVC screen content coding draft text 2," Joint Collaborative Team on Video Coding (JCT-VC) of ITU-T SG 16 WP 3 and ISO/IEC JTC 1/SC 29/WG 11, 19$^{th}$ Meeting: Strasbourg, FR, 17-24 Oct. 2014.

With respect to the HEVC framework, as an example, the palette-based coding techniques may be configured to be used as a coding unit (CU) mode. In other examples, the palette-based coding techniques may be configured to be used as a prediction unit (PU) mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/ standards. In these cases, the unit for palette coding can be square blocks, rectangular blocks or even regions of non-rectangular shape.

In some examples, a palette may be derived for one or more CUs, PUs, or any region of data (e.g., any block of data). For example, a palette may comprise (and may consist of) the most dominant pixel values in the current CU, where CU is the region of data for this particular example. The size and the elements of the palette are first transmitted from a video encoder to a video decoder. The size and/or the elements of the palette can be directly coded or predictively coded using the size and/or the elements of the palette in the neighboring CUs (e.g. above and/or left coded CU). After that, the pixel values in the CU are encoded based on the palette according to a certain scanning order. For each pixel location in the CU, a flag (e.g., palette_flag or escape_flag) may be first transmitted to indicate whether the pixel value is included in the palette. For those pixel values that map to an entry in the palette, the palette index associated with that entry is signaled for the given pixel location in the CU. Instead of sending the flag (e.g., palette_flag or escape_flag), for those pixel values that do not exist in the palette, a special index may be assigned to the pixel and the actual pixel value (possibly in quantized form) may be transmitted for the given pixel location in the CU. These pixels are referred to as "escape pixels." An escape pixel can be coded using any existing entropy coding method such as fixed length coding, unary coding, etc. In some examples, one or more techniques described herein may utilize a flag such as palette_flag or escape_flag. In other examples, one or more techniques described herein may not utilize a flag such as palette_flag or escape_flag.

Samples in a block of video data may be processed (e.g., scanned) using a horizontal raster scanning order or other scanning order. For example, the video encoder may convert a two-dimensional block of palette indices into a one-dimensional array by scanning the palette indices using a horizontal raster scanning order. Likewise, the video decoder may reconstruct a block of palette indices using the horizontal raster scanning order. Accordingly, this disclosure may refer to a previous sample as a sample that precedes the sample currently being coded in the block in the scanning order. It should be appreciated that scans other than a horizontal raster scan, such as vertical raster scanning order, may also be applicable. The example above, as well as other examples set forth in this disclosure, is intended to provide a general description of palette-based video coding.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding and entropy coding (e.g., CABAC) in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by the HEVC standard.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via, for example, disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

Source device 12 and destination device 14 may be configured to perform palette-based coding and entropy coding (e.g., CABAC) consistent with this disclosure. The techniques of this disclosure for palette-based coding or CABAC, however, are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above, and described in the HEVC standard. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma. Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma. Cb and Cr residual blocks) of a CU into one or more transform blocks (e.g., luma. Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

With respect to CABAC, as an example, video encoder 20 and video decoder 30 may select a probability model (also referred to as a context model) to code symbols associated with a block of video data based on context. For example, a context model (Ctx) may be an index or offset that is applied to select one of a plurality of different contexts, each of which may correspond to a particular probability model. Accordingly, a different probability model is typically defined for each context. After encoding or decoding the bin, the probability model is further updated based on a value of the bin to reflect the most current probability estimates for the bin. For example, a probability model may be maintained as a state in a finite state machine. Each particular state may correspond to a specific probability value. The next state, which corresponds to an update of the probability model, may depend on the value of the current bin (e.g., the bin currently being coded). Accordingly, the selection of a probability model may be influenced by the values of the previously coded bins, because the values indicate, at least in part, the probability of the bin having a given value. The context coding process described above may generally be referred to as a context-adaptive coding mode.

Hence, video encoder 20 may encode a target symbol using a probability model. Likewise, video decoder 30 may parse a target symbol using the probability model. In some instances, video encoder 20 may code syntax elements using a combination of context adaptive and non-context adaptive coding. For example, video encoder 20 may context code bins by selecting a probability model or "context model" that operates on context to code some of the bins. In contrast, for other bins, video encoder 20 may bypass code bins by bypassing, or omitting the regular arithmetic coding process when coding the bins. In such examples, video encoder 20 may use a fixed probability model to bypass code the bins. That is, bypass coded bins do not include context or probability updates.

Video encoder 20 may output a bitstream that includes the entropy-encoded syntax elements. The bitstream may also include syntax elements that are not entropy encoded. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the inter-predicted PUs of a current CU. Likewise, video decoder 30 may generate intra-predicted blocks for PU's of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding residual values obtained from inverse quantization and inverse transformation of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors or pixel values representing the video data of a particular area (e.g., a given block). In this way, rather than coding actual pixel values or their residuals for a current block of video data, the video coder may code index values for one or more of the pixels values of the current block, where the index values indicate entries in the palette that are used to represent the pixel values of the current block.

For example, video encoder 20 may encode a block of video data by determining a palette for the block, locating an entry in the palette to represent the value of each pixel, and encoding the palette and the index values for the pixels relating the pixel value to the palette. Video decoder 30 may obtain, from an encoded bitstream, a palette for a block, as well as index values for the pixels of the block. Video decoder 30 may match the index values of the individual pixels to entries of the palette to reconstruct the pixel values of the block. In instances where the index value associated with an individual pixel does not match any index value of the corresponding palette for the block, video decoder 30 may identify such a pixel as an escape pixel, for the purposes of palette-based coding.

As described in more detail below, the basic idea of palette-based coding is that, for a given block of video data to be coded, video encoder 20 may derive a palette that includes the most dominant pixel values in the current block. For instance, the palette may refer to a number of pixel values which are determined or assumed to be dominant and/or representative for the current CU. Video encoder 20 may first transmit the size and the elements of the palette to video decoder 30. Additionally, video encoder 20 may encode the pixel values in the given block according to a certain scanning order. For each pixel included in the given block, video encoder 20 may signal the index value that maps the pixel value to a corresponding entry in the palette. If the pixel value is not included in the palette (i.e., no palette entry exists that specifies a particular pixel value of the palette-coded block), then such a pixel is defined as an "escape pixel." In accordance with palette-based coding, video encoder 20 may encode and signal an index value that is reserved for an escape pixel. In some examples, video encoder 20 may also encode and signal the pixel value (or a quantized version thereof) for an escape pixel included in the given block. For example, video decoder 30 may be configured to determine whether a pixel value matches or is otherwise close to a palette entry based on a distortion metric (e.g., MSE, SAD, and the like Upon receiving the encoded video bitstream signaled by video encoder 20, video decoder 30 may first determine the palette based on the information received from video encoder 20. Video decoder 30 may then map the received index values associated with the pixel locations in the given block to entries of the palette to reconstruct the pixel values of the given block. In some instances, video decoder 30 may determine that a pixel of a palette-coded block is an escape pixel, such as by determining that the pixel is palette-coded with an index value reserved for escape pixels. In instances where video decoder 30 identifies an escape pixel in a palette-coded block, video decoder 30 may receive the pixel value (or a quantized version thereof) for an escape pixel included in the given block. Video decoder 30 may reconstruct the palette-coded block by mapping the individual pixel values to the corresponding palette entries, and by using the pixel value (or a quantized version thereof) to reconstruct any escape pixels included in the palette-coded block.

A stated above, in an example palette-coding mode, a palette may include entries numbered by an index. Each entry may represent color component values or intensities (for example, in color spaces such as YCbCr, RGB, YUV, CMYK, or other formats), which can be used as a predictor for a block or as final reconstructed block samples. As described in standard submission document JCTVC-Q0094 (Wei Pu et al., "AHG 10: Suggested Software for Palette Coding based on RExt6.0," JCTVC-Q0094. Valencia, ES, 27 Mar.-4 Apr. 2014) a palette may include entries that are copied from a predictor palette. A predictor palette may include palette entries from blocks previously coded using palette mode or other reconstructed samples. For each entry in the predictor palette, a binary flag is sent to indicate whether that entry is copied to the current palette (indicated by flag=1). This is referred to as the binary palette prediction vector. Additionally the current palette may comprise (e.g., consist of) new entries signaled explicitly. The number of new entries may be signaled as well.

As another example, in palette mode, a palette may include entries numbered by an index representing color component values that may be used as predictors for block samples or as final reconstructed block samples. Each entry in the palette may contain, for example, one luma component (e.g., luma value), two chroma components (e.g., two chroma values), or three color components (e.g., RGB, YUV, etc.). Previously decoded palette entries may be stored in a list. This list may be used to predict palette entries in the current palette coding CU, for example. A binary prediction vector may be signaled in the bitstream to indicate which entries in the list are re-used in the current palette. In some examples, run-length coding may be used to compress the binary palate predictor. For example, a run-length value may be coded using 0th order Exp-Golomb code.

In this disclosure, it will be assumed that each palette entry specifies the values for all color components of a sample. However, the concepts of this disclosure are applicable to using a separate palette and/or a separate palette entry for each color component. Also, it is assumed that samples in a block are processed using horizontal raster scanning order. However, other scans such as vertical raster scanning order are also applicable. As mentioned above, a palette may contain predicted palette entries, for example, predicted from the palette(s) used to code the previous block(s), and the new entries which may be specific for the current block and are signaled explicitly. The encoder and decoder may know the number of the predicted and new palette entries and a sum of them may indicate the total palette size in a block.

As proposed in the example of JCTVC-Q0094 cited above, each sample in a block coded with the palette may belong to one of the three modes, as set forth below:
  Escape mode. In this mode, the sample value is not included into a palette as a palette entry and the quantized sample value is signaled explicitly for all color components. It is similar to the signaling of the new palette entries, although for new palette entries, the color component values are not quantized.
  CopyAbove mode (also called CopyFromTop mode). In this mode, the palette entry index for the current sample is copied from the sample located directly above the current sample in a block of samples. In other examples, for copy above mode, a block of video data may be transposed so that the sample above the block is actually the sample to the left of the block.
  Value mode (also called index mode). In this mode, the value of the palette entry index is explicitly signaled.

As described herein, a palette entry index may be referred as a palette index or simply index. These terms can be used interchangeably to describe techniques of this disclosure. In addition, as described in greater detail below, a palette index may have one or more associated color or intensity values.

For example, a palette index may have a single associated color or intensity value associated with a single color or intensity component of a pixel (e.g., an Red component of RGB data, a Y component of YUV data, or the like). In another example, a palette index may have multiple associated color or intensity values. In some instances, palette-based video coding may be applied to code monochrome video. Accordingly, "color value" may generally refer to any color or non-color component used to generate a pixel value.

A run value may indicate a run of palette index values that are coded using the same palette-coding mode. For example, with respect to Value mode, a video coder (e.g., video encoder 20 or video decoder 30) may code an index value and a run value that indicates a number of consecutive subsequent samples in a scan order that have the same index value and that are being coded with the palette index. With respect to CopyAbove mode, the video coder may code an indication that an index value for the current sample value is the same as an index value of an above-neighboring sample (e.g., a sample that is positioned above the sample currently being coded in a block) and a run value that indicates a number of consecutive subsequent samples in a scan order that also copy an index value from an above-neighboring sample. Accordingly, in the examples above, a run of palette index values refers to a run of palette values having the same value or a run of index values that are copied from above-neighboring samples.

Hence, the run may specify, for a given mode, the number of subsequent samples that belong to the same mode. In some instances, signaling an index value and a run value may be similar to run-length coding. In an example for purposes of illustration, a string of consecutive palette index values of an index block corresponding to a block of video data may be 0, 2, 2, 2, 2, 5. Each index value corresponds to a sample in the block of video data. In this example, a video coder may code the second sample (e.g., the first palette index value of "2") using Value mode. After coding an index value of 2, the video coder may code a run of 3, which indicates that the three subsequent samples also have the same palette index value of 2. In a similar manner, coding a run of four palette indices after coding an index using CopyAbove mode may indicate that a total of five palette indices are copied from the corresponding palette index values in the row above the sample position currently being coded.

Using the palette, video encoder 20 and/or video decoder 30 may be configured to code a block of samples (e.g., a block of video data) into an index block, where the index block is a block including index values that map to one or more palette entries, and, in some examples, one or more escape pixel values. Video encoder 20 may be configured to entropy encode the index block to compress the index block. Similarly, video decoder 30 may be configured to entropy decode an encoded index block to generate the index block from which video decoder 30 may generate a block of samples (e.g., the block of video data encoded by encoder 20). For example, run-length based entropy coding may be used to compress and decompress the index block. In some examples, video encoder 20 and video decoder 30 may be configured to respectively entropy encode and decode the index block using CABAC.

To apply CABAC coding to information (e.g., a syntax element, an index block such as the index values of the index block, or other information), a video coder (e.g., video encoder 20 and video decoder 30) may perform binarization on the information. Binarization refers to the process of converting information into a series of one or more bits.

Each series of one or more bits may be referred to as "bins." Binarization is a lossless process and may include one or a combination of the following coding techniques: fixed length coding, unary coding, truncated unary coding, truncated Rice coding, Golomb coding, exponential Golomb coding, Golomb-Rice coding, any form of Golomb coding, any form of Rice coding, and any form of entropy coding. For example, binarization may include representing the integer value of 5 as 00000101 using an 8-bit fixed length technique or as 11110 using a unary coding technique.

After binarization, a video coder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, the video coder may arithmetically code that bin based on the context, which is known as context mode coding. Bins coded using a CABAC context mode coding may be referred to as "context bins."

Further, rather than performing context mode coding on all bins, a video coder (e.g., video encoder 20 and video decoder 30) may code some bins using bypass CABAC coding (e.g., bypass mode coding). Bypass mode coding refers to the process of arithmetically coding a bin without using an adaptive context (e.g., a coding context). That is, the bypass coding engine does not select contexts and may assume a probability of 0.5 for both symbols (0 and 1). Although bypass mode coding may not be as bandwidth-efficient as context mode coding, it may be computationally less expensive to perform bypass mode coding on a bin rather than to perform context mode coding on the bin. Further, performing bypass mode coding may allow for a higher degree of parallelization and throughput. Bins coded using bypass mode coding may be referred to as "bypass bins."

Video encoder 20 and video decoder 30 may be configured with a CABAC coder (e.g., a CABAC encoder and a CABAC decoder, respectively). A CABAC coder may include a context mode coding engine to perform CABAC context mode coding and a bypass mode coding engine to perform bypass mode coding. If a bin is context mode coded, the context mode coding engine is used to code this bin. The context mode coding engine may need more than two processing cycles to code a single bin. However, with proper pipeline design, a context mode coding engine may only need n+M cycles to encode n bins, where M is the overhead to start the pipeline. M is usually greater than 0.

At the start of the CABAC coding process (i.e., every switch from bypass mode to context mode and vice versa), pipeline overhead is introduced. If a bin is bypass mode coded, the bypass mode coding engine is used to code this bin. The bypass mode coding engine may be expected to need only one cycle to code n-bit information, where n may be greater than one. Thus, the total number of cycles to code a set of bypass bins and context bins may be reduced if all of the bypass bins within the set are coded together and all of the context bins within the set are coded together. In particular, coding the bypass bins together before or after transitioning to context mode coding can save the overhead required to restart the context mode coding engine. For example, video encoder 20 and video decoder 30 may be configured to switch between bypass mode to context mode while respectively encoding or decoding a block of video data using palette mode. In another example, video encoder 20 and video decoder 30 may be configured to reduce the number of times the encoding or decoding process switches between bypass mode to context mode when encoding or decoding a block of video data using palette mode.

The techniques described in this disclosure may include techniques for various combinations of one or more of signaling palette-based video coding modes, transmitting palettes, deriving palettes, signaling scanning order, deriving scanning order, and transmitting palette-based video coding maps and other syntax elements. For example, techniques of this disclosure may be directed to entropy coding palette information. In some examples, the techniques of this disclosure may, among other things, be used to increase coding efficiency and reduce coding inefficiencies associated with palette-based video coding. Accordingly, as described in greater detail below, the techniques of this disclosure may, in some instances, improve efficiency and improve bitrate when coding video data using a palette mode.

As described above, in the current palette mode design in screen content coding, the syntax elements of palette_index_idc and palette_escape_val are CABAC bypass coded, and are interleaved with other syntax elements (e.g., palette_run_msb_id_plus1) that are CABAC context coded. However, it may be beneficial to group the bypass coded information (e.g., syntax elements) together, which may improve coding efficiency and/or reduce codec complexity.

The syntax element of palette_index_idc may be an indication of an index to the array represented by currentPaletteEntries, as defined in, for example, JCTVC-S1005. The value of palette_index_idc may be in the range of 0 to (adjustedIndexMax−1), inclusive. The syntax element of palette_escape_val may specify the quantized escape coded sample value for a component, as defined in, for example, JCTVC-S1005. palette_run_msb_id_plus1 minus 1 may specify the index of the most significant bit in the binary representation of paletteRun, as defined in, for example, JCTVC-S1005. The variable paletteRun may specify the number of consecutive locations minus 1 with the same palette index as the position in the above row when palette_run_type_flag is equal to COPY_ABOVE_MODE or specifies the number of consecutive locations minus 1 with the same palette index when palette_run_type_flag is equal to COPY_INDEX_MODE, as defined in, for example, JCTVC-S1005. Additional details regarding palette_index_idc, palette_escape_val, palette_run_msb_id_plus1, currentPaletteEntries, adjustedIndexMax, and paletteRun may be found in JCTVC-S1005.

In some examples, this disclosure describes a method of grouping all of the syntax elements palette_index_idc at the front of the palette index block coding section to improve CABAC throughput. For instance, video encoder 20 may be configured to encode all of the syntax elements palette_index_idc at the front of the palette index block coding section. For example, video encoder 20 may be configured to encode all of the syntax elements palette_index_idc before encoding syntax elements to be context mode encoded. Similarly, video decoder 30 may be configured to decode all of the syntax elements palette_index_idc at the front of the palette index block coding section. For example, video decoder 30 may be configured to decode all of the syntax elements palette_index_idc before decoding context mode encoded syntax elements.

As another example, video encoder 20 may be configured to bypass mode encode all of the syntax elements palette_index_idc at the front of the palette index block coding section such that all of the syntax elements palette_index_idc are encoded before encoding syntax element(s) related to palette run type (e.g., CopyAbove mode or index mode) and/or run length (e.g., palette_run_msb_id_plus1). Similarly, video decoder 30 may be configured to decode all of the syntax elements palette_index_idc for a block at the front of the palette index block coding section of the block such that all of the syntax elements palette_index_idc are decoded before decoding syntax element(s) related to palette run type (e.g., CopyAbove mode or index mode) and/or run length (e.g., palette_run_msb_id_plus1).

syntax element(s) related to palette run type (e.g., CopyAbove mode or index mode) and/or run length (e.g., palette_run_msb_id_plus1).

As another example, example, video encoder 20 may be configured to encode all of the syntax elements palette_index_idc before context encoding syntax element(s) related to palette run type (e.g., CopyAbove mode or index mode) and/or run length (e.g., palette_run_msb_id_plus1). Similarly, video decoder 30 may be configured to decode all of the syntax elements palette_index_idc before context decoding syntax element(s) related to palette run type (e.g., CopyAbove mode or index mode) and/or run length (e.g., palette_run_msb_id_plus1).

As another example, video encoder 20 may be configured to encode all of the syntax elements palette_index_idc within the palette block coding section before encoding syntax elements to be context mode encoded. Similarly, video decoder 30 may be configured to decode all of the syntax elements palette_index_idc within the palette block coding section before decoding context mode encoded syntax elements. As another example, video encoder 20 may be configured to encode all of the syntax elements palette_index_idc within the palette block coding section before context encoding syntax element(s) related to palette run type (e.g., CopyAbove mode or index mode) and/or run length (e.g., palette_run_msb_id_plus1). Similarly, video decoder 30 may be configured to decode all of the syntax elements palette_index_idc within the palette block coding section before context decoding syntax element(s) related to palette run type (e.g., CopyAbove mode or index mode) and/or run length (e.g., palette_run_msb_id_plus1).

In general, video encoder 20 and video decoder 30 may be configured to not interleave the encoding or decoding of palette_index_idc in bypass mode with syntax elements that are to be encoded or decoded using context mode, respectively. For example, video encoder 20 and video decoder 30 may be configured to not interleave the encoding or decoding of palette_index_idc in bypass mode with syntax element(s) related to palette run type (e.g., CopyAbove mode or index mode) and/or run length (e.g., palette_run_msb_id_plus1) that are to be encoded or decoded using context mode, respectively. As another example, video encoder 20 may be configured to bypass encode all instances of the palette_index_idc syntax element before context encoding a syntax element that requires context mode. Similarly, video decoder 30 may be configured to bypass decode all instances of the palette_index_idc syntax element before context decoding a syntax element that requires context mode. As another example, video encoder 20 may be configured to bypass encode all instances of the palette_index_idc syntax element before context encoding syntax element(s) related to palette run type (e.g., CopyAbove mode or index mode) and/or run length (e.g., palette_run_msb_id_plus1). Similarly, video decoder 30 may be configured to bypass decode all instances of the palette_index_idc syntax element before context decoding syntax element(s) related to palette run type (e.g., CopyAbove mode or index mode) and/or run length (e.g., palette_run_msb_id_plus1).

Video encoder 20 and video decoder 30 may also respectively encode and decode a value representing the number of occurrences of palette_index_idc. Video encoder 20 and video decoder 30 may use the value representing the number of occurrences of palette_index_idc to respectively encode or decode each of the syntax elements palette_index_idc. The techniques described in this disclosure may also remove the redundancy of palette run length related syntax elements, and remove the redundancy of palette_run_type_flag and palette_index_idc.

In some examples, this disclosure describes a method of grouping all of the syntax elements palette_escape_val at the front of the palette index block coding section of a block (e.g., a PU or a CU) to improve CABAC throughput. For instance, video encoder 20 may be configured to encode all of the syntax elements palette_escape_val at the front of the palette index block coding section of a block. For example, video encoder 20 may be configured to bypass mode encode all of the syntax elements palette_escape_val at the front of the palette index block coding section such that all of the syntax elements palette_escape_val are encoded before encoding syntax element(s) related to palette run type (e.g., CopyAbove mode or index mode) and/or run length (e.g., palette_run_msb_id_plus1). Similarly, video decoder 30 may be configured to decode all of the syntax elements palette_escape_val for a block at the front of the palette index block coding section of the block such that all of the syntax elements palette_escape_val are decoded before decoding syntax element(s) related to palette run type (e.g., CopyAbove mode or index mode) and/or run length (e.g., palette_run_msb_id_plus1). As another example, video encoder 20 may be configured to encode all of the syntax elements palette_escape_val before encoding syntax elements to be context mode encoded. For example, video encoder 20 may be configured to encode all of the syntax elements palette_escape_val before context encoding syntax element(s) related to palette run type (e.g., CopyAbove mode or index mode) and/or run length (e.g., palette_run_msb_id_plus1). Similarly, video decoder 30 may be configured to decode all of the syntax elements palette_escape_val for a block at the front of the palette index block coding section of the block. For example, video decoder 30 may be configured to decode all of the syntax elements palette_escape_val before decoding context mode encoded syntax elements in a block.

As another example, video encoder 20 may be configured to encode all of the syntax elements palette_escape_val within the palette block coding section of a block before encoding syntax elements to be context mode encoded. Similarly, video decoder 30 may be configured to decode all of the syntax elements palette_escape_val within the palette block coding section of a block before decoding context mode encoded syntax elements of the block.

In general, video encoder 20 and video decoder 30 may be configured to not interleave the encoding or decoding of palette_escape_val for a block (e.g., a PU or a CU) in bypass mode with syntax elements that are to be encoded or decoded using context mode for the block, respectively. For example, video encoder 20 and video decoder 30 may be configured to not interleave the encoding or decoding of palette_escape_val in bypass mode with syntax element(s) related to palette run type (e.g., CopyAbove mode or index mode) and/or run length (e.g., palette_run_msb_id_plus1) that are to be encoded or decoded using context mode, respectively. As another example, video encoder 20 may be configured to bypass encode all instances of the palette_escape_val syntax element for a block before context encoding a syntax element that requires context mode. Similarly, video decoder 30 may be configured to bypass decode all instances of the palette_escape_val syntax element of a block (e.g., a PU or a CU) before context decoding a syntax element that requires context mode of the block.

Video encoder 20 and video decoder 30 may also respectively encode and decode a value representing the number of occurrences of palette_escape_val for a block. Video encoder 20 and video decoder 30 may use the value representing the number of occurrences of palette_escape_val to respectively encode or decode each of the syntax elements palette_escape_val for the block. The techniques described in this disclosure may reduce the dynamic range of palette_index_idc for a block, which may result in improved coding efficiency.

The techniques, aspects, and/or examples described herein may be utilized in conjunction with one another in any combination or separately from one another. For instance, video encoder 20 and video decoder 30 may be configured to perform any one or any suitable combination of one or more of the techniques, aspects, and/or examples described herein.

In some examples, to improve CABAC throughput, a video coder (e.g., video encoder 20) may be configured to group all of the occurrences of the syntax element palette_index_idc as described above. For example, the video coder (e.g., video encoder 20) may be configured to group all of the occurrences of the syntax element palette_index_idc in the current block (e.g., a PU or a CU) at the front of the index coding section for the current block. Similarly, a video decoder (e.g., video decoder 30) may be configured to decode all of the syntax elements palette_index_idc as described above. FIG. 7 illustrates one example where video encoder 20 may be configured to group all of the occurrences of the syntax element palette_index_idc in the current block (e.g., a CU) at, for example, the front of the index coding block relative to R. Joshi and J. Xu, "High efficient video coding (HEVC) screen content coding: Draft 2," JCTVC-S1005, Section 7.3.3.8. This aspect of the disclosure is referred to as Aspect 1. Specifically, FIG. 7 illustrates an example of video encoder 20 relocating an instance of the syntax element palette_index_idc to the front of the index coding block (which may also be referred to as the palette block coding section or the front of the index coding block). By relocating the illustrated instance of the syntax element palette_index_idc, video encoder 20 may be configured to improve CABAC throughput by coding all instances of the syntax element palette_index_idc using bypass mode and switching over to context mode to code palette information occurring after all instances of the syntax element palette_index_idc in the index coding block are bypass mode encoded.

According to the disclosure of JCTVC-S1005, one instance of palette_index_idc would be coded in bypass mode, then one instance of a syntax element related to palette run type and one instance of palette_run_msb_id_plus1 would be coded in context mode, and the process would repeat while (scanPos<nCbS*nCbS), meaning that the video encoder would switch back and forth between bypass mode coding and context mode coding because the syntax elements to be coded using bypass mode are not grouped together. This is depicted in FIG. 7 with the ellipse immediately below the while loop of "while(scanPos< nCbS*nCbS)" (i.e., the ellipse excludes the information showing that a syntax element related to palette run type is encoded using context mode), the box surrounding the if-statement with the consequent of the palette_index_idc syntax element being under the while loop of "while (scanPos<nCbS*nCbS)," and the subsequent pseudo-code.

However, as described above, FIG. 7 also depicts Aspect 1 of this disclosure, which is the grouping (which may also be referred to as the re-location) of one or more instances of the syntax element palette_index_idc to, for example, the front of the index coding block. By re-locating one or more syntax elements (e.g., or other palette information) to be encoded using bypass mode, a video encoder (e.g., video encoder 20) may increase the throughput of entropy coding by reducing the number of times the video encoder or video decoder must switch between bypass mode encoding and context mode encoding. Similarly, by re-locating one or more syntax elements in such a manner, the throughput of a video decoder (e.g., video decoder 30) may increase because the number of times the video decoder must switch between bypass mode decoding and context mode decoding is reduced. In some examples of the techniques described in this disclosure, all instances of the palette_index_idc syntax element would be coded in bypass mode before an instance of palette_run_msb_id_plus1 would be coded in context mode.

In some examples, video encoder 20 may be configured to signal the number of occurrences (e.g., instances) of the syntax element palette_index_idc using a syntax element named, for example, num_palette_index. For example, video encoder 20 may signal a value for num_palette_index in a bitstream, where the value is representative of the number of occurrences of the syntax element palette_index_idc. In some examples, video encoder 20 may be configured to not signal an index value as palette_index_idc. In such examples, video decoder 30 may be configured to infer the index value. For example, an occurrence of palette_index_idc may be counted in num_palette_index, which may be equal to the number of times a run type (e.g., COPY_INDEX_MODE) occurs in a particular block. Even when a run type (e.g., COPY_INDEX_MODE) is inferred or palette_index_idc is inferred, it still counts towards num_palette_index. As used herein, reference to a number of indices parsed, decoded, or remaining to be decoded may, in some examples, refer to the number of COPY_INDEX_MODE irrespective of whether the mode or the index is inferred. Video decoder 30 may be configured to determine the number of occurrences (e.g., instances) of syntax element palette_index_idc by, for example, decoding an encoded value corresponding to the num_palette_index syntax element from a bitstream. This aspect of the disclosure is referred to as Aspect 2. Video encoder 20 and video decoder 30 may be configured to implement Aspect 1 with Aspect 2 or without Aspect 2. Syntax wise, Aspect 2 may, according to some examples, be defined as:

```
indices_idc_coding( ) {
    num_palette_index                           ae(v)
    for (i = 0; i < num_palette_index; i++)
        palette_index_idc                       ae(v)
}
```

In some examples, video encoder 20 and video decoder 30 may be configured to implement (e.g., by enabling) Aspects 1 and 2 only when the variable indexMax is greater than 1. This aspect of the disclosure is referred to as Aspect 3. The variable indexMax may specify the number of distinct values that a palette index has for the current coding unit. In some examples, indexMax may refer to the quantity of (palette size+palette_escape_val_present_flag).

In some examples, Aspects 1 and 2 may be disabled when: (a) there is no escape pixel (i.e. palette_escape_val_present_flag==0) in the current block and the palette size is less than 2; or (b) there may be at least one escape pixel (i.e. palette_escape_val_present_flag==1) in the current block and the palette size is equal to 0. In other examples, video encoder 20 and video decoder 30 may be configured to implement (e.g., by enabling) Aspects 1 and 2 only when the variable indexMax is greater than 2. Similarly, in examples where indexMax is equal to (palette size+palette_escape_val_present_flag), Aspects 1 and 2 may be enabled (e.g., implemented) when indexMax is greater than 1. For example, if palette size is 0 and palette_escape_val_present_flag is 1, all the pixels in the block are escape pixels; and, as such, the indices are already known. As another example, if palette_escape_val_present_flag is 0 and palette size is 1, again, each pixel has an index 0; and, as such, no signaling of indices may be necessary.

In some examples, video encoder 20 may be configured to implement Aspects 1 and 2 such that the last occurrence (e.g., instance) of the syntax element palette_run_type_flag[xC][yC] is signaled by video encoder 20 at the front of the palette index block coding section. This aspect of the disclosure is referred to as Aspect 4. Specifically, the syntax table may be updated by, according to some example, adding a new syntax element palette_last_run_type_flag as follows:

```
indices_idc_coding( ) {
    num_palette_index                              ae(v)
    for (i = 0; i < num_palette_index; i++)
        palette_index_idc                          ae(v)
        palette_last_run_type_flag                 ae(v)
}
```

Video decoder 30 may be configured to determine the last occurrence (e.g., instance) of the syntax element palette_run_type_flag[xC][yC] by, for example, decoding an encoded palette_last_run_type_flag syntax element from a bitstream. The syntax element of palette_last_run_type_flag may be bypass mode coded or context mode coded in, for example, CABAC. In examples where the palette_last_run_type_flag syntax element is context mode coded, the palette_last_run_type_flag syntax element may share the same context(s) with palette_run_type_flag[xC][yC], or the palette_last_run_type_flag syntax element may have its own context(s) that are independent from the context(s) of palette_run_type_flag[xC][yC].

In some examples, video decoder 30 may be configured to decode the syntax element palette_index_idc such that the dynamic range adjustment process is disabled for the first occurrence (e.g., instance) of the palette_index_idc syntax element. This aspect of the disclosure is referred to as Aspect 5. Specifically, a process very similar to the adjustedIndexMax variable's derivation procedure specified in JCTVC-S1005 Section 7.4.9.6 is used. For comparison purposes, JCTVC-S1005 describes that the variable adjustedIndexMax may be derived as follows:

```
adjustedIndexMax = indexMax
if( scanPos > 0 )
    adjustedIndexMax - = 1
```

However, according to Aspect 5 of this disclosure, the variable adjustIndexMax may be derived as set forth below. For example, for each block, a variable isFirstIndex is initialized to 1 before parsing. In some examples, the variable adjustedIndexMax may be derived as follows:

```
adjustedIndexMax = indexMax
palette_index_idc
if( isFirstIndex ) {
    adjustedIndexMax - = isFirstIndex
    isFirstIndex = 0
}
```

In some examples, video decoder 30 may be configured to check one or more conditions before parsing and decoding the paletteRun. This aspect of the disclosure is referred to as Aspect 6. The variable paletteRun may specify the number of consecutive locations minus 1 with the same palette index as the position in the above row when palette_run_type_flag is equal to COPY_ABOVE_MODE or specify the number of consecutive locations minus 1 with the same palette index when palette_run_type_flag is equal to COPY_INDEX_MODE, as disclosed by JCTVC-S1005, for example.

Referring to the one or more conditions that video decoder 30 may be configured to check, if video decoder 30 determines that one or more of the conditions are satisfied, video decoder 30 may be configured to bypass the parsing and decoding process for the syntax elements related to the current paletteRun (i.e. palette_run_msb_id_plus1 and palette_run_refinement_bits). In such an example, video decoder 30 may be configured to implicitly derive the current paletteRun as running to the end of the current block, i.e., equal to maxPaletteRun. The list of one or more conditions relating to Aspect 6 include: (i) the number of parsed/decoded palette_index_idc syntax elements equal to num_palette_index; or, alternatively, a variable paletteIndicesLeft may be defined that equals num_palette_index minus the number of indices received, and with such a definition, this condition may be stated as paletteIndicesLeft is equal to zero; and/or (ii) the current palette run type palette_run_type_flag[xC][yC] equals to the last palette run type palette_last_run_type_flag.

In some examples, if conditions (i) and (ii) set forth above for Aspect 6 are not satisfied simultaneously, video encoder 20 may be configured to code the palette run length into the bitstream. This aspect of the disclosure is referred to as Aspect 7. In other examples, if conditions (i) and (ii) set forth above for Aspect 6 are not satisfied simultaneously, video encoder 20 may be configured to code the palette run length into the bitstream. According to the current draft specification JCTVC-S1005, a parameter specifying the maximum achievable run length is required as input, where the parameter is equal to maxPaletteRun=nCbS*nCbS-scanPos-1. According to this disclosure, however, video encoder 20 may be configured to reduce the parameter specifying the maximum achievable run length to maxPaletteRun=nCbS*nCbS-scanPos-1-paletteIndicesLeft to improve coding efficiency. As used herein, nCbS specifies the size of the current block.

In some examples, a normative constraint may be imposed on video encoder 20 requiring that it never signals a palette with unused entries if a block is not in palette share mode (i.e., palette_share_flag[x0][y0]==0). This aspect of the disclosure is referred to as Aspect 8.

In some examples, for palette mode not using palette-share, video decoder 30 may be configured to bypass the decoding of the current occurrence (e.g., instance) of the syntax element palette_index_idc when one or more of the following conditions are satisfied: condition 1 where num_palette_index equals indexMax, and condition 2 where paletteIndicesLeft==1. In such examples, video decoder 30 may be configured to implicitly derive the value for the current occurrence of the syntax element palette_index_idc as an index that is in the palette, but has yet to appear in the index map during the decoding process (e.g., has not appeared in the index map up to this point in the decoding process). This aspect of the disclosure is referred to as Aspect 9.

Video decoder 30 may be configured to derive the value for the current occurrence of the syntax element palette_index_idc as set forth above for Aspect 9 because condition 1 requires that every index between 0 and (indexMax−1), inclusively, be signaled and only be signaled once. Therefore, after the first (indexMax−1) index values are signaled, video decoder 30 may be configured to derive the last index value as the number between 0 and (indexMax−1), which has yet to appear during the decoding process for the current index map.

In some examples, video decoder 30 may be configured to bypass the decoding of the current occurrence (e.g., instance) of the syntax element palette_run_type_flag[xC][yC] when one or both of the following conditions are satisfied: condition 1 where paletteIndicesLeft equals 0, and condition 2 where the current pixel is at the last position of the block in scanning order. In such examples, video decoder 30 may be configured to implicitly derive the value for the current occurrence of the syntax element palette_run_type_flag[xC][yC]. For example, when condition 1 is satisfied, palette_run_type_flag[xC][yC] video decoder 30 may be configured to derive the value for the current occurrence of the syntax element palette_run_type_flag[xC][yC] as COPY_ABOVE_MODE. As another example, when condition 1 is satisfied, palette_run_type_flag[xC][yC] video decoder 30 may be configured to derive the value for the current occurrence of the syntax element palette_run_type_flag[xC][yC] as COPY_INDEX_MODE if paletteIndicesLeft>0, and as COPY_ABOVE_MODE if paletteIndicesLeft=0. This aspect of the disclosure is referred to as Aspect 10.

As described herein, video encoder 20 and video decoder 30 may be configured to determine when a condition is satisfied. For example, with respect to Aspect 10, video decoder 30 may be configured to determine whether condition 1 is satisfied. Similarly, video decoder 30 may be configured to determine whether condition 2 is satisfied. In response to determining that condition 1 or condition 2 is satisfied, video decoder 30 may be configured to derive the value for the current occurrence of the syntax element palette_run_type_flag[xC][yC] as set forth above.

In some examples, video encoder 20 and video decoder 30 may be configured to respectively encode or decode the num_palette_index syntax element using any golomb code family. For example, video encoder 20 and video decoder 30 may be configured to respectively encode or decode the num_palette_index syntax element using, for example, Golomb Rice code, exponential Golomb code, Truncated Rice code, Unary code, or a concatenation of Golomb Rice and exponential Golomb code. This aspect of the disclosure is referred to as Aspect 11.

In other examples, video encoder 20 and video decoder 30 may be configured to respectively encode or decode the num_palette_index syntax element using any truncated version of any golomb code family. For example, video encoder 20 and video decoder 30 may be configured to respectively encode or decode the num_palette_index syntax element using, for example, truncated Golomb Rice code, truncated Exponential Golomb code, truncated Truncated Rice code, truncated Unary code, or a concatenation of truncated Rice code and exponential Golomb code such as the code used to code coeff_abs_level_remaining syntax elements. This aspect of the disclosure is referred to as Aspect 12.

In some examples, any golomb parameters relating to Aspects 11 or 12 depend upon the CU size, indexMax, palette size, and/or palette_escape_val_present_flag. Such dependency may be expressed as equations or a lookup table. In some examples, video encoder 20 may be configured to signal the lookup table or the parameters in the equations such that they are received by video decoder 30 in, for example, the SPS/PPS/Slice header. Alternatively or additionally, the parameters may be adaptively updated on a block-by-block basis. This aspect of the disclosure is referred to as Aspect 13. In some examples, the golomb parameter cRiceParam may depend on indexMax, palette size, and/or palette_escape_val_present_flag. The golomb parameter cRiceParam may change from block to block.

In some examples, video encoder 20 may be configured to predictively encode num_palette_index by signaling the difference between the value of num_palette_index and an offset value, which may be expressed by a syntax element named, for example, numPaletteIndexCoded. This aspect of the disclosure is referred to as Aspect 14. For example, video encoder 20 may be configured to predictively encode num_palette_index by signaling a value for numPaletteIndexCoded, where numPaletteIndexCoded=num_palette_index−IndexOffsetValue. Similarly, video decoder 30 may be configured to predictively decode num_palette_index by, for example, determining a value for numPaletteIndexCoded from a bitstream. Since numPaletteIndexCoded=num_palette_index−IndexOffsetValue, video decoder 30 may be configured to determine the value of num_palette_index based on the determined value of numPaletteIndexCoded and the value of IndexOffsetValue.

In some examples, the variable IndexOffsetValue may be a constant. For example, IndexOffsetValue may equal a constant value of X for palette share mode or may equal a constant value of Y for non-palette share mode, where X and Y are integers. In some examples, X and Y may be the same (e.g., X equals Y such as equaling 1). In other examples, X and Y may be different (e.g., X does not equal Y). For example, IndexOffsetValue may equal 9 when palette share mode is used, and IndexOffsetValue may equal 33 when non-share mode is used. In some examples, the variable IndexOffsetValue may depend on the syntax element palette_share_flag[x0][y0]. In other examples, the variable IndexOffsetValue may depend on the variable indexMax. For example. IndexOffsetValue may equal indexMax. In some examples, video encoder 20 may be configured to signal IndexOffsetValue in the SPS/PPS/Slice header. Alternatively or additionally, the variable IndexOffsetValue may be adaptively updated block-by-block, meaning that the value corresponding to the variable IndexOffsetValue may be adaptively updated block-by-block.

In some examples, video encoder 20 and video decoder 30 may be configured to respectively encode or decode numPaletteIndexCoded may be coded using any golomb code family or any truncated golomb family, such as a concatenation of Golomb Rice and exponential Golomb code. For example, when IndexOffsetValue equals 1, numPaletteIndexCoded equals num_palette_index−1.

In some examples, video encoder 20 and video decoder 30 may be configured to respectively encode or decode numPaletteIndexCoded using any golomb code family. For example, video encoder 20 and video decoder 30 may be configured to respectively encode or decode numPaletteIndexCoded using, for example, Golomb Rice code, exponential Golomb code, Truncated Rice code, Unary code, or a concatenation of Golomb Rice and exponential Golomb code.

In other examples, video encoder 20 and video decoder 30 may be configured to respectively encode or decode numPaletteIndexCoded using any truncated version of any golomb code family. For example, video encoder 20 and video decoder 30 may be configured to respectively encode or decode numPaletteIndexCoded using, for example, truncated Golomb Rice code, truncated Exponential Golomb code, truncated Truncated Rice code, truncated Unary code, or a concatenation of truncated Rice code and exponential Golomb code such as the code used to code coeff_abs_level_remaining syntax elements.

To code numPaletteIndexCoded, video encoder 20 may be configured to determine the sign of numPaletteIndexCoded. Video encoder 20 may be configured to signal a flag indicating whether the value of numPaletteIndexCoded is negative or not (e.g., whether the determined sign is positive or negative). This aspect of the disclosure is referred to as Aspect 15. In some examples, video encoder 20 may be configured to signal the flag, and then signal the value of numPaletteIndexCoded. In other examples, video encoder 20 may be configured to signal the value of numPaletteIndexCoded, and then signal the flag. Video encoder 20 may be configured to encode the flag using bypass mode or context mode. If context coded, the contexts may depend on CU size, indexMax, palette size, and/or palette_escape_val_present_flag.

As described above, video encoder 20 may be configured to determine the sign of numPaletteIndexCoded according to some examples. If the determined sign of numPaletteIndexCoded is negative, video encoder 20 may be configured to encode the value of (1−numPaletteIndexCoded) into the bitstream. If the determined sign of numPaletteIndexCoded is positive, video encoder 20 may be configured to encode the value of numPaletteIndexCoded into the bitsteam. Video encoder 20 may be configured to encode the value of (1−numPaletteIndexCoded) or the value numPaletteIndexCoded) using different golomb code parameters depending on, for example, the sign of numPaletteIndexCoded, CU size, indexMax, palette size, and/or palette_escape_val_present_flag.

In some examples, video encoder 20 may be configured to represent the negative parts of numPaletteIndexCoded using a mapping operation, which may be in addition to or may be an alternative to Aspect 15. This aspect of the disclosure is referred to as Aspect 16. For example, a mapping interval may be introduced and defined as a variable mapInterval. Video encoder 20 may be configured to, using variable mapInterval, map negative values of numPaletteIndexCoded to equally spaced positive values equal to: mapInterval×(−numPaletteIndexCoded)−1. The corresponding positive value of numPaletteIndexCoded may be shifted accordingly to accommodate the positions taken by the mapped negative values.

For example, if mapInterval=2, and numPaletteIndexCoded is chosen from {−3, −2, −1, 0, 1, 2, 3}, then the mapping can be illustrated as in Table I below. In this example, video encoder 20 may be configured to encode the values of numPaletteIndexCode using the mapped values in Table I. For example, video encoder 20 may be configured to entropy encode the mapped values into binary form.

TABLE I

Codeword Mapping Example

| numPaletteIndexCoded | mapped value |
|---|---|
| −3 | 5 |
| −2 | 3 |
| −1 | 1 |
| 0 | 0 |
| 1 | 2 |
| 2 | 4 |
| 3 | 6 |

In some examples, video encoder 20 may be configured to represent the negative parts of numPaletteIndexCoded using a mapping operation as described with respect to Aspect 16. Video encoder 20 may also be configured to remove one or more redundancies that may be present when implementing Aspect 16. This aspect of the disclosure is referred to as Aspect 17. For example, the number of negative values of numPaletteIndexCoded may range from A={−1, −2, . . . −IndexOffsetValue+1}. As another example, the number of negative values of numPaletteIndexCode may range from A={−1, −2, . . . , −IndexOffsetValue+1, IndexOffsetValue}. In either of these examples, the mapped value only needs to reserve (IndexOffsetValue−1) or IndexOffsetValue positions for the negative numPaletteIndexCoded values. For example, if mapInterval=2, and numPaletteIndexCoded is chosen form {−3, −2, −1, 0, 1, 2, 3, 4, 5, 6, 7, 8}, the mapping is illustrated in Table II below. In this example, video encoder 20 may be configured to encode the values of numPaletteIndexCode using the mapped values in Table II. For example, video encoder 20 may be configured to entropy encode the mapped values into binary form.

TABLE II

Codeword Mapping Example

| numPaletteIndexCoded | mapped value |
|---|---|
| −3 | 5 |
| −2 | 3 |
| −1 | 1 |
| 0 | 0 |
| 1 | 2 |
| 2 | 4 |
| 3 | 6 |
| 4 | 7 |
| 5 | 8 |
| 6 | 9 |
| 7 | 10 |
| 8 | 11 |

As shown in Table II above, video encoder 20 may be configured to encode the mapped values corresponding to the values of numPaletteIndexCode such that negative and positive values of numPaletteIndexCode are not interleaved after a certain value. For example, in the example of Table II above, there is no interleaving of positive and negative values of numPaletteIndexCoded via the mapped values beginning with value 3 of numPaletteIndexCoded (i.e., positive values 3-8 of numPaletteIndexCoded map to mapped values 6-11).

As described above, video encoder 20 may also be configured to remove one or more redundancies that may be present when implementing Aspect 16. Another redundancy example different from the redundancy example described above includes: As num_palette_index is upper bounded by the total number of pixels in the current block, numPaletteIndexCoded is also upper bounded. Therefore, after allocating the positions for all of the possibilities of the positive codeword, the negative values can be mapped to the following positions without interleaving. For example, if mapInterval=2, and numPaletteIndexCoded is chosen form {−5, −4, −3, −2, −1, 0, 1, 2, 3}, the mapping is illustrated in Table III below. In this example, video encoder 20 may be configured to encode the values of numPaletteIndexCode using the mapped values in Table III. For example, video encoder 20 may be configured to entropy encode the mapped values into binary form.

coding's contexts depend on the previous palette run length or depend on the previous run's palette_run_msb_id_plus1 indexMax, and/or CU size.

In some examples, to further group bypass bins, video encoder 20 may be configured to signal the number of escape indices in a palette block as well as escape values before signaling the palette run type (i.e. palette_run_type_flag[xC][yC]) as follows. This aspect of the disclosure is referred to as Aspect 19. Italicized portions illustrate changes relative to previous version(s) of JCT-VC S1005, and bolded portions as well as the "ae(v)" in the right column indicate the signaling of a syntax element.

```
...
    if( currentPaletteSize != 0 )
        palette_escape_val_present_flag                                          ae(v)
    if( palette_escape_val_present_flag || (indexMax > 0))
        escape_idc_coding( )
            if( palette_escape_val_present_flag ) {
                if( cu_qp_delta_enabled_flag && !IsCuQpDeltaCoded ) {
                    cu_qp_delta_palette_abs                                      ae(v)
                    if( cu_qp_delta_palette_abs )
                        cu_qp_delta_palette_sign_flag                            ae(v)
                }
                if( cu_chroma_qp_offset_enabled_flag
                    && !IsCuChromaQpOffsetCoded ) {
                    cu_chroma_qp_palette_offset_flag                             ae(v)
                    if( cu_chroma_qp_offset_flag && chroma_qp_offset_list_len_minus1
                        > 0 )
                        cu_chroma_qp_palette_offset_idx                          ae(v)
                }
            }
    if( indexMax > 0)
        palette_transpose_flag                                                   ae(v)
    scanPos = 0
    while( scanPos < nCbS * nCbS ) {
        ...
```

TABLE III

Codeword Mapping Example

| numPaletteIndexCoded | mapped value |
|---|---|
| −5 | 8 |
| −4 | 7 |
| −3 | 5 |
| −2 | 3 |
| −1 | 1 |
| 0 | 0 |
| 1 | 2 |
| 2 | 4 |
| 3 | 6 |

As shown in Table III above, video encoder 20 may be configured to encode the mapped values corresponding to the values of numPaletteIndexCode such that negative and positive values of numPaletteIndexCode are not interleaved after a certain value. For example, in the example of Table III above, there is no interleaving of positive and negative values of numPaletteIndexCoded via the mapped values beginning with value 4 of numPaletteIndexCoded (i.e., negative values−4 and −5 of numPaletteIndexCoded map to mapped values 7 and 8).

In some examples, video encoder 20 may be configured to further decouple the relationship between palette index and palette run. This aspect of the disclosure is referred to as Aspect 18. For example, instead of allowing the palette run coding's contexts depend on parsed or decoded indices, video encoder 20 may be configured to make the palette run In the example above, escape_idc_coding( ) consists of signaling the number of escape indices and escape values corresponding to each escape index. The number of escape indices in a palette block may not be signaled if palette_escape_val_present_flag is 0 or if indexMax is equal to 0. In the former case, the number of escape indices is inferred to be 0 and no escape values are signaled. In the latter case of indexMax equal to 0, the number of escape indices is inferred to be equal to the block size when palette_escape_val_present_flag equals 1 and escape values are signaled, or the number of escape indices is inferred to be zero when palette_escape_val_present_flag equals 0.

In some examples, video encoder 20 may be configured to signal the number of escape indices using golomb code family. This aspect of the disclosure is referred to as Aspect 20. For example, video encoder 20 may be configured to signal the number of escape indices using, for example, Golomb Rice code, exponential Golomb code, Truncated Rice code, Unary code, or a concatenation of Golomb Rice and exponential Golomb code. Truncated versions of the above codes may be used with maximum set equal to the block size.

In some examples, it is proposed to enforce a normative restriction on palette_escape_val_present_flag that when palette_escape_val_present_flag equals to 0, there is no escape pixel in the current block. This aspect of the disclosure is referred to as Aspect 21. When palette_escape_val_present_flag equals to 1, there is at least one escape pixel in the current block. With this restriction, in escape_idc_coding( ), the number of escape indices minus 1 can be coded instead of number of escape indices to improve coding efficiency. In that case, the maximum value for truncated golomb code family may be adjusted to (blockSize−1), accordingly.

In some examples, when the number of escape indices is signaled before coding the indices map block and when all of the escape indices have already been coded, then index-Max may be reduced by 1. Furthermore, if indexMax becomes 1, the index, run and mode coding is terminated since the indices for all the remaining samples may be inferred. This aspect of the disclosure is referred to as Aspect 22. As one example of Aspect 22, assume palette size equals 1 and palette_escape_val_present_flag equals 1. Ordinarily, the possible index values are 0 and 1, where 1 is used for escape sample(s). Under Aspect 22, video encoder 20 may be configured to signal the number of escape values/samples. Then, when the indices are being signaled and the last escape value/sample is encountered, both video encoder 20 and/or video decoder 30 may be configured to infer (e.g., determine) that there are no more escape values/samples. As such, video encoder 20 and/or video decoder 30 may be configured to determine that the only index value that can occur from the last escape value/sample to the end of the block is 0, meaning that video encoder 20 may be configured to not signal the mode, index value, and/or run value from the last escape value/sample to the end of the block.

In some examples, escape_idc_coding( ) is used in combination with indices_idc_coding( ). This aspect of the disclosure is referred to as Aspect 23. In one example, the number of escape indices may be signaled before signaling the number of indices. In this case, only the number of non-escape indices need to be signaled in indices_idc_coding( ). In one example, the number of escape indices may be signaled after signaling the number of indices. In this case, the maximum value for truncated golomb code family may be adjusted to num_palette_index, accordingly.

Video encoder 20 and/or video decoder 30 may be configured to operate according to the techniques described in this disclosure. In general, video encoder 20 and/or video decoder 30 may be configured to determine that a current block is coded in palette mode, bypass mode code a plurality of instances of a first syntax element for reconstructing the current block, and after bypass mode code a plurality of instance of the first syntax element, context mode decoding a plurality of instances of a second syntax element for reconstructing the current block.

Figure 2:
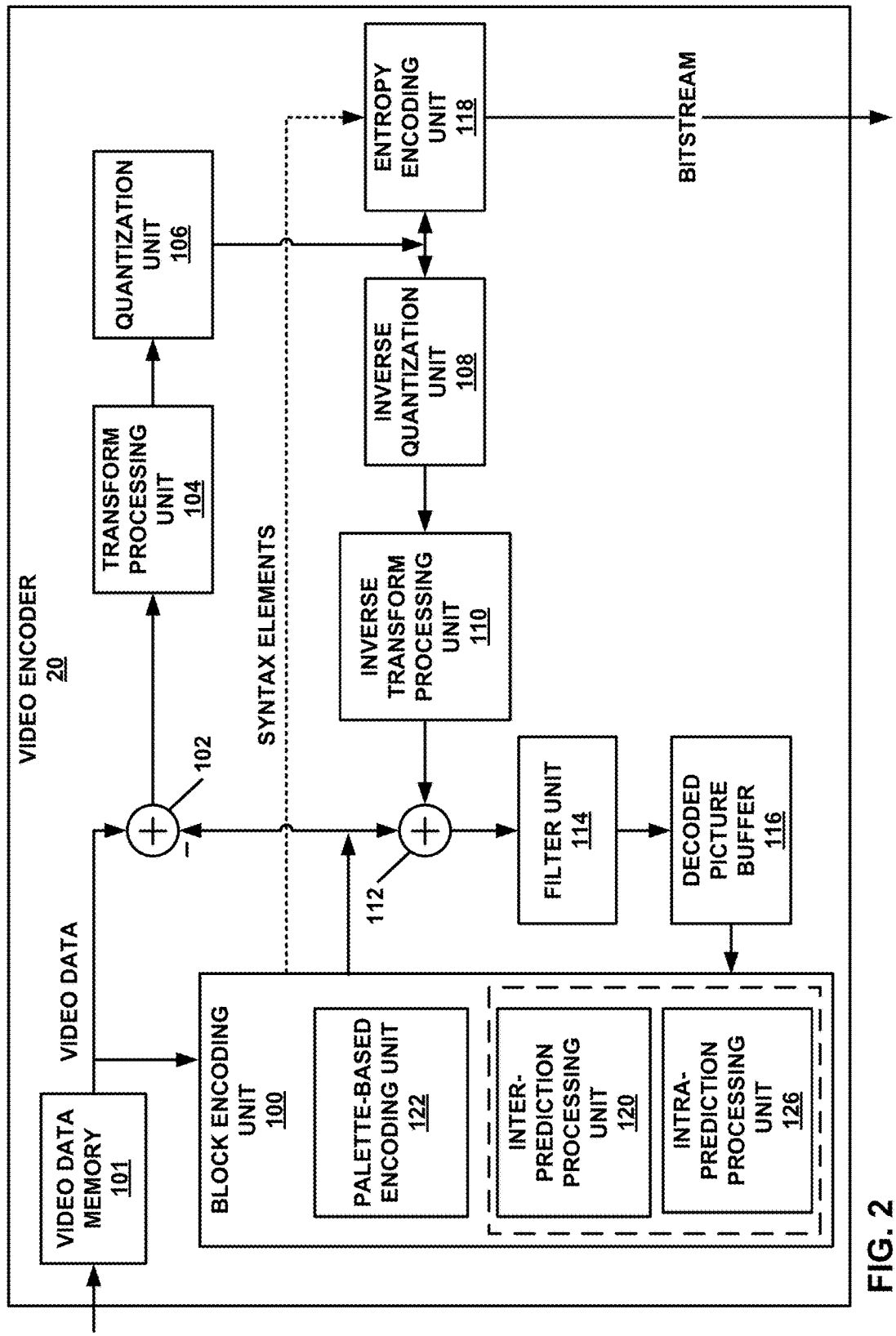
FIG. 2 is a block diagram illustrating an example video encoder that may perform the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding and, for example, the SCC extension of HEVC. However, the techniques of this disclosure may be applicable to other coding standards or methods.

Video encoder 20 represents an example of a device that may be configured to perform techniques for palette-based coding and entropy coding (e.g., CABAC) in accordance with various examples described in this disclosure.

In the example of FIG. 2, video encoder 20 includes a block encoding unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Block encoding unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, block encoding unit 100 may perform quad-tree partitioning to divide the CTBs of the CTU into progressively-smaller blocks. The smaller block may be coding blocks of CUs. For example, block encoding unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, block encoding unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0 ") for a reference region for the PU. The reference region for the PU may be a region, within a reference picture, that contains sample blocks that most closely corresponds to the sample blocks of the PU. The motion estimation unit of inter-prediction processing unit 120 may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1 ") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

In accordance with various examples of this disclosure, video encoder 20 may be configured to perform palette-based coding. With respect to the HEVC framework, as an example, the palette-based coding techniques may be configured to be used at the CU level. In other examples, the palette-based video coding techniques may be configured to be used at the PU level. In other examples, the palette-based coding techniques may be configured to be used at the sub-prediction unit (sub-PU) level (e.g., a sub-block of a prediction unit). Accordingly, all of the disclosed processes described herein (throughout this disclosure) in the context of a CU level may, additionally or alternatively, apply to a PU level or a sub-PU level. However, these HEVC-based examples should not be considered a restriction or limitation of the palette-based video coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based decoding when a palette-based encoding mode is selected, e.g., for a CU or PU. For example, palette-based encoding unit 122 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described herein.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Block encoding unit 100 may select the predictive data for PUs of a CU from among the predictive data generated by inter-prediction processing unit 120 for the PUs or the predictive data generated by intra-prediction processing unit 126 for the PUs. In some examples, block encoding unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma. Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, in some examples, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by block encoding unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Filter unit 114 may perform other filtering operations, including sample adaptive offset (SAO) filtering and/or adaptive loop filtering (ALF). Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from block encoding unit 100. Entropy encoding unit 118 may perform one or more entropy encoding operations on the data to generate entropy-encoded data. For example, entropy encoding unit 118 may perform a context-adaptive coding operation, such as a CABAC operation, context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

According to one or more of the techniques of this disclosure, video encoder 20, and specifically palette-based encoding unit 122, may perform palette-based video coding of predicted video blocks. As described above, a palette generated by video encoder 20 may be explicitly encoded and sent to video decoder 30, predicted from previous palette entries, predicted from previous pixel values, or a combination thereof.

In accordance with one or more techniques of this disclosure, video encoder 20 may be configured to determine that a current block is coded in palette mode, bypass mode encode a plurality of instances of a first syntax element for reconstructing the current block, and after bypass mode encode a plurality of instance of the first syntax element, context mode encode a plurality of instances of a second syntax element for reconstructing the current block, e.g., using a CABAC coding process. Video encoder 20 may be configured to bypass mode encode any two instances of the plurality of instances of the first syntax element, e.g., using a bypass mode of a CABAC coding process, without interleaving with the context mode encoding of any one instance of the plurality of instances of the second syntax element. In one example, the first syntax element comprises one of a palette_index_idc syntax element or palette_escape_val syntax element, and the second syntax element comprises a palette_run_msb_id_plus1 syntax element. Video encoder 20 may be configured to bypass encode the plurality of instances of the first syntax element at a front of an index block coding section for the current block.

Video encoder 20 may be configured to encode a third syntax element indicating a number of instances of the first syntax element, wherein bypass mode encoding the plurality of instances of the first syntax element comprises bypass mode encoding the plurality of instances of the first syntax element based on the third syntax element. Video encoder 20 may encode the third syntax element using one of a Golomb Rice code, exponential Golomb code, Truncated Rice code, Unary code, a concatenation of Golomb Rice and exponential Golomb code, or a truncated version of any of the previous codes.

Figure 3:
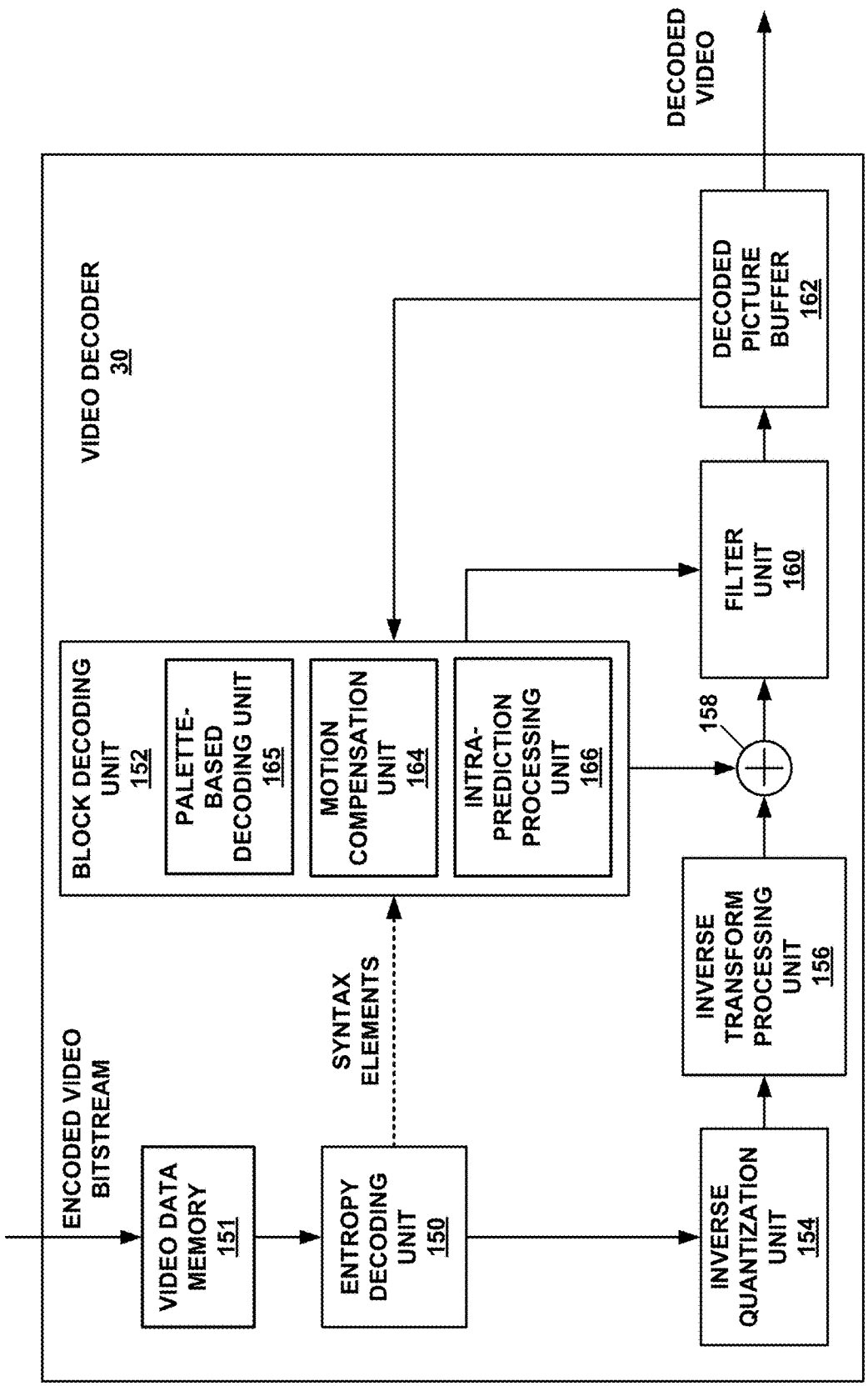
FIG. 3 is a block diagram illustrating an example video decoder that may perform the techniques described in this disclosure.

FIG. 3 is a block diagram illustrating an example video decoder 30 that is configured to perform the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

The details of palette coding described above with respect to encoder 20 are not repeated here with respect to decoder 30, but it is understood that decoder 30 may perform the reciprocal decoding process relative to any encoding process described herein with respect to encoder 20.

Video decoder 30 represents an example of a device that may be configured to perform techniques for palette-based coding and entropy coding (e.g., CABAC) in accordance with various examples described in this disclosure.

In the example of FIG. 3, video decoder 30 includes an entropy decoding unit 150, video data memory 151, a block decoding unit 152, an inverse quantization unit 154, an inverse transform processing unit 156, a reconstruction unit 158, a filter unit 160, and a decoded picture buffer 162. Block decoding unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB), which may be provided by video data memory 151, may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Block decoding unit 152, inverse quantization unit 154, inverse transform processing unit 156, reconstruction unit 158, and filter unit 160 may generate decoded video data based on the syntax elements extracted from the bitstream.

Video decoder 30 may be configured to perform a process generally reciprocal to that of video encoder 20 described herein. Similarly, video encoder 20 may be configured to perform a process generally reciprocal to that of video decoder 30 described herein. For example, disclosure that video decoder 30 may be configured to decode an encoded syntax element in a bitstream likewise necessarily discloses that video encoder 20 may be configured to encode the syntax element into the bitstream.

As another example, entropy decoding unit 150 may be configured to perform a process generally reciprocal to that of entropy encoding unit 118 described herein. According to aspects of this disclosure, entropy decoding unit 150 may be configured to entropy decode any code words generated by entropy encoding unit 118. For example, entropy decoding unit 150 may be configured to entropy decode uniform and non-uniform kth order truncated Exp-Golomb (TEGk)-encoded values, such as a binary palette prediction vector and/or a palette map for a CU. As another example, entropy decoding unit 150 may be configured to entropy decode a kth order Exp-Golomb (EGk) code word, a kth order truncated Exp-Golomb (TEGk) code word, a kth order non-uniform truncated Exp-Golomb (TEGk) code word, or any combination thereof.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra-prediction mode to generate the predictive luma. Cb and Cr blocks for the PU based on the prediction blocks of spatially-neighboring PUs. Intra-prediction processing unit 166 may determine the intra prediction mode for the PU based on one or more syntax elements decoded from the bitstream.

Block decoding unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma. Cb, and Cr blocks in decoded picture buffer 162, intra prediction or inter prediction operations on PUs of other CUs.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such as an HEVC inter-predictive or intra-predictive coding mode. The block of video data may be, for example, a CU or PU generated according to an HEVC coding process. The palette-based coding mode may comprise one of a plurality of different palette-based coding modes, or there may be a single palette-based coding mode.

According to aspects of this disclosure, palette-based decoding unit 165 may be configured to perform any combination of the techniques for palette coding described herein. The details of palette coding described above with respect to encoder 20 are not repeated here with respect to decoder 30, but it is understood that decoder 30 may perform the reciprocal palette-based decoding process relative to any palette-based encoding process described herein with respect to encoder 20.

Video decoder 30 may be configured to determine that a current block is coded in palette mode, bypass mode decode a plurality of instances of a first syntax element for reconstructing the current block, e.g., using a bypass mode of a CABAC coding process, and after bypass mode decoding a plurality of instance of the first syntax element, context mode decode a plurality of instances of a second syntax element for reconstructing the current block, e.g., using a CABAC coding process. Video decoder 30 may bypass mode decode any two instances of the plurality of instances of the first syntax element without interleaving with the context mode decoding of any one instance of the plurality of instances of the second syntax element. In some examples, the first syntax element comprises one of a palette_index_idc syntax element or palette_escape_val syntax element, and the second syntax element comprises a palette_run_msb_id_plus1 syntax element. Video decoder 30 may bypass decode the plurality of instances of the first syntax element at a front of an index block coding section for the current block.

Video decoder 30 may decode a third syntax element indicating a number of instances of the first syntax element, wherein bypass mode decoding the plurality of instances of the first syntax element comprises bypass mode decoding the plurality of instances of the first syntax element based on the third syntax element. Video decoder 30 may decode the third syntax element using one of a Golomb Rice code, exponential Golomb code, Truncated Rice code. Unary code, a concatenation of Golomb Rice and exponential Golomb code, or a truncated version of any of the previous codes.

Figure 4:
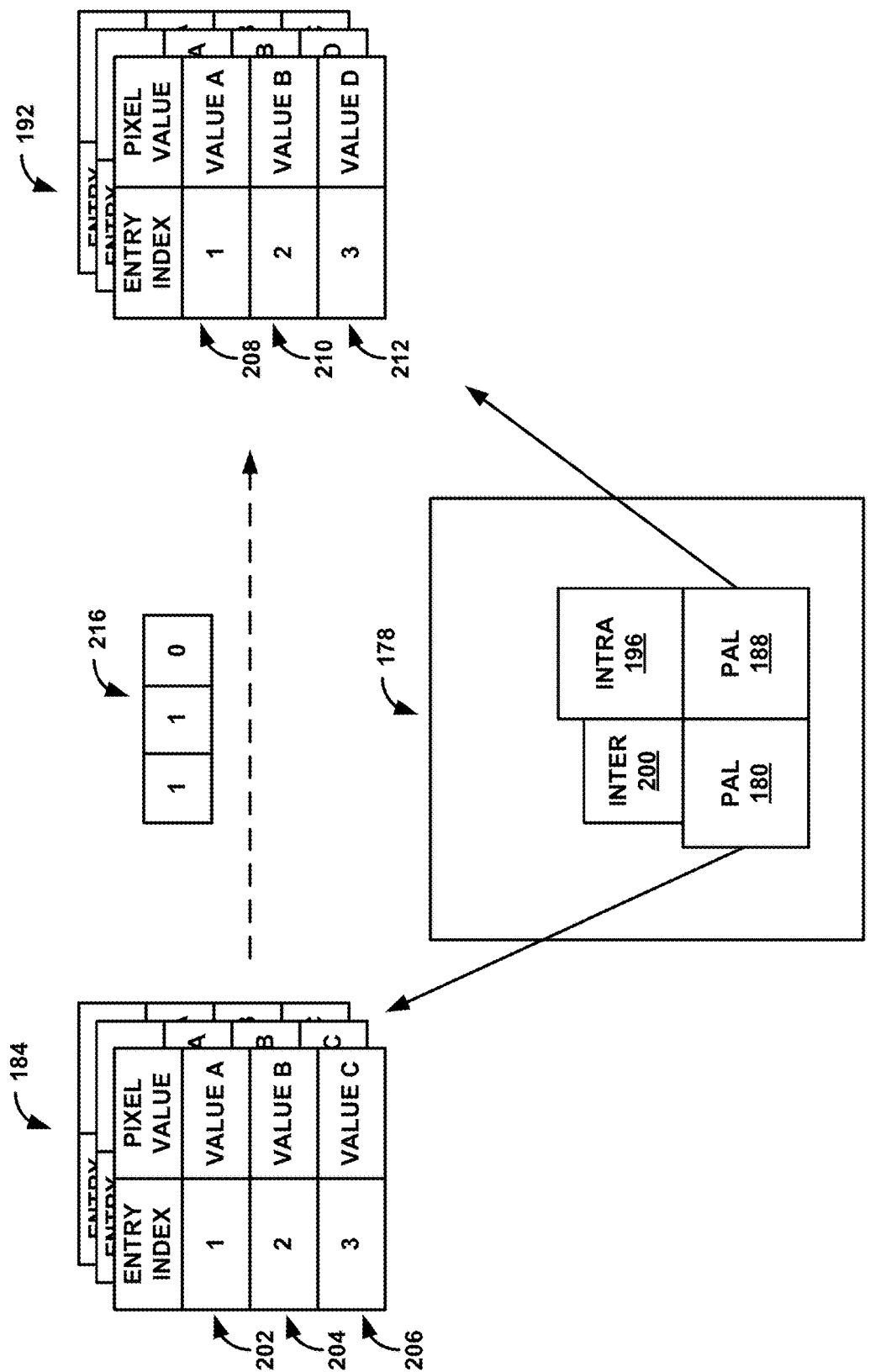
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first PAL (palette) coding unit (CU) 180 that is associated with first palettes 184 and a second PAL CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 (which may also be referred to as indexes/indices 184) and second palettes 192 (which may also be referred to as indexes/indices 192) are shown as including multiple palettes (which may also be referred to as multiple indexes). In some examples, according to aspects of this disclosure, a video coder (such as video encoder 20 or video decoder 30) may code palettes (e.g., indexes) separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. First palettes 184 relate the index values (e.g., the values shown in the left column of first palettes 184) to pixel values. For example, as shown in FIG. 4, one of first palettes 184 relates index values 1, 2, and 3 to pixel values A, B, and C, respectively. As described herein, rather than coding the actual pixel values of first CU 180, a video coder (such as video encoder 20 or video decoder 30) may use palette-based coding to code the pixels of the block using the indices 1-3 (which may also be expressed as index values 1-3). That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. In some examples, such as the example illustrated in FIG. 4, video encoder 20 and/or video decoder 30 may locate the previously coded CU such as a left neighboring CU (first CU 180) when determining a predictive palette for second CU 188.

In the example of FIG. 4, second palettes 192 include three entries 208-212 having entry index value 1, entry index value 2, and entry index value 3, respectively. Second palettes 192 relate the index values (e.g., the values shown in the left column of first palettes 192) to pixel values. For example, as shown in FIG. 4, one of the second palettes 192 relates index values 1, 2, and 3 to pixel values A, B, and D, respectively. In this example, video encoder 20 may code one or more syntax elements indicating which entries of first palettes 184 are included in second palettes 192. In the example of FIG. 4, the one or more syntax elements are illustrated as a vector 216. Vector 216 has a number of associated bins (or bits), with each bin indicating whether the palette predictor associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector.

In some examples, video encoder 20 and video decoder 30 may determine a palette predictor list (which may also be referred to as a palette predictor table) when performing palette prediction. The palette predictor list may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the palette predictor list are to be included in a palette for coding a current block.

Figure 5:
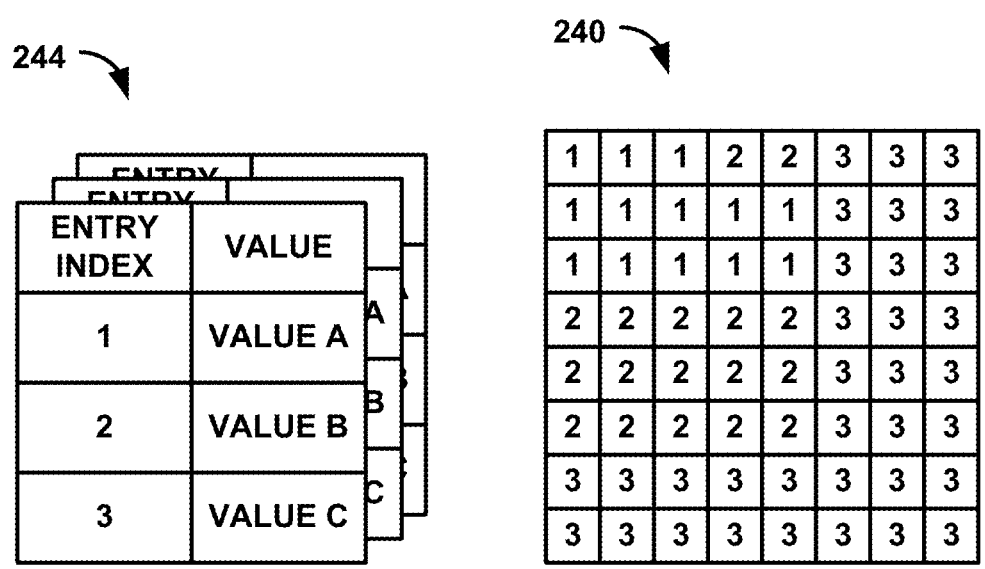
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes an index block 240 (which may also be referred to as map 240 or index map 240) including index values (e.g., index values 1, 2, and 3) that relate respective positions of pixels associated with the index values to an entry of palettes 244.

While index block 240 is illustrated in the example of FIG. 5 as including an index value for each pixel position, it should be understood that in other examples, not all pixel positions may be associated with an index value relating the pixel value to an entry of palettes 244. That is, as noted above, in some examples, video encoder 20 may encode (and video decoder 30 may obtain, from an encoded bitstream) an indication of an actual pixel value (or its quantized version) for a position in index block 240 if the pixel value is not included in palettes 244.

In some examples, video encoder 20 and video decoder 30 may be configured to code an additional map indicating which pixel positions are associated with which index values. For example, assume that the (i, j) entry in the index block 240 corresponds to the (i, j) position of a CU. Video encoder 20 may encode one or more syntax elements for each entry of the index block (i.e., each pixel position) indicating whether the entry has an associated index value. For example, video encoder 20 may encode a flag having a value of one to indicate that the pixel value at the (i, j) location in the CU is one of the values in palettes 244.

Video encoder 20 may, in such an example, also encode a palette (shown in the example of FIG. 5 as 244). In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

In some examples in accordance with the techniques of this disclosure, entropy encoding unit 118 and entropy decoding unit 150 may be configured to entropy code index block 240. For example, entropy encoding unit 118 and entropy decoding unit 150 may be configured to entropy code run-lengths (e.g., run-length values or codes) and/or a binary palette prediction vector relating to an index block in palette mode.

Figure 6:
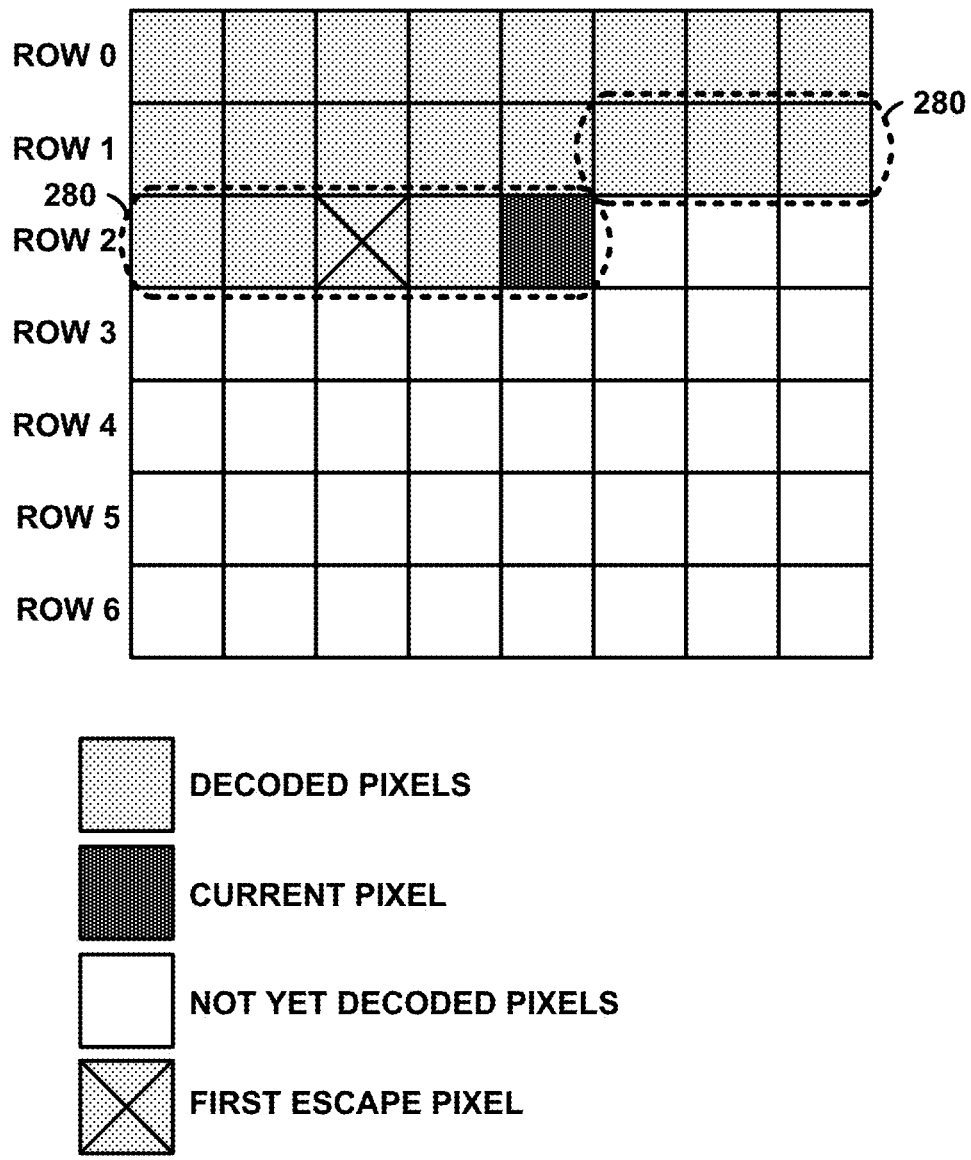
FIG. 6 is a conceptual diagram illustrating an example of determining maximum copy above run-length, assuming raster scanning order, consistent with techniques of this disclosure.

FIG. 6 is a conceptual diagram illustrating an example of determining maximum copy above run-length, assuming an example of a raster scanning order, consistent with techniques of this disclosure. In the example of FIG. 6, if none of the pixels encompassed by dashed lines 280 is coded as an escape sample, the maximum possible run-length is 35 (i.e. the number of unshaded pixel positions). If one or more of the pixels within dashed lines 280 is coded as an escape sample, assuming that the pixel marked as the escape pixel (the pixel position with the "X") is the first escape pixel within dashed lines 280 in scanning order, then the maximum possible coded copy above run-length is five.

In some examples, video decoder 30 may only determine the run mode (e.g., the palette mode in which the pixels are coded) for the pixels within dashed lines 280. Hence, in the worst case, video decoder 30 makes the determination for BlockWidth-1 pixels. In some examples, video decoder 30 may be configured to implement certain restrictions regarding the maximum of number of pixels for which the run mode is checked. For example, video decoder 30 may only check the pixels within dashed lines 280 if the pixels are in the same row as the current pixel. Video decoder 30 may infer that all other pixels within dashed lines 280 are not coded as escape samples. The example in FIG. 6 assumes a raster scanning order. The techniques however, may be applied to other scanning orders, such as vertical, horizontal traverse, and vertical traverse.

In accordance with an example of this disclosure, if the current run mode is 'copy above,' the run-length's contexts for a current pixel may depend on the index value of the above-neighboring pixel's index relative to the current pixel. In this example, if the above-neighboring pixel relative to the current pixel is outside of the current CU, the video decoder assumes that the corresponding index equals to a predefined constant k. In some examples, k=0.

During entropy coding, an entropy encoder or decoder may place bits of a symbol to be encoded or decoded into one or more bins. The bins may indicate whether a value of a symbol is equal to zero. The entropy coder or entropy decoder may use the values of the bins to adjust entropy coding process. In some examples, an entropy encoder or decoder may also use bins to indicate whether a values is greater than a specific value, e.g., greater than zero, greater than one, etc.

In some examples, if the current mode is 'copy above,' the first bin of the run-length codeword selects one of the two candidate CABAC contexts based on whether the above-neighboring sample (e.g., pixel) relative to the current sample (e.g., pixel) equals to 0 or not.

As another example, if the current mode is 'copy previous,' the first bin of the run-length codeword selects one of the four candidate CABAC contexts based on whether the index value equals to 0, equals 1, equals to 2, or larger than 2.

Figure 8:
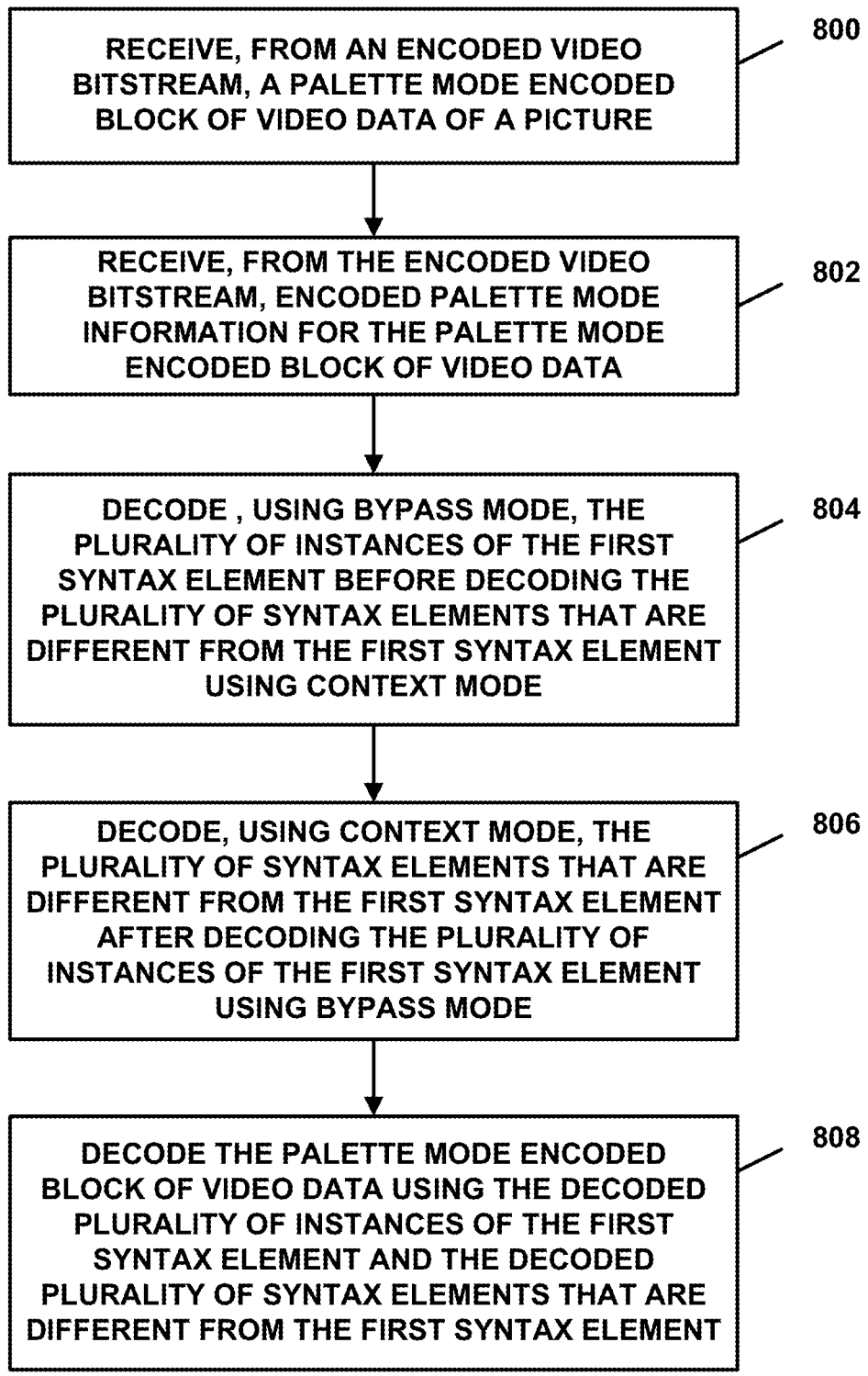
FIG. 8 is a flowchart illustrating an example process for decoding video data consistent with techniques for palette-based video coding of this disclosure.

FIG. 8 is a flowchart illustrating an example process for decoding video data consistent with techniques of this disclosure. The process of FIG. 8 is generally described as being performed by video decoder 30 for purposes of illustration, although a variety of other processors may also carry out the process shown in FIG. 8. In some examples, block decoding unit 152, palette-based decoding unit 165, and/or entropy decoding unit 150 may perform one or more processes shown in FIG. 8.

In the example of FIG. 8, video decoder 30 may be configured to receive, from an encoded video bitstream, a palette mode encoded block of video data of a picture (800). Video decoder 30 may be configured to receive, from the encoded video bitstream, encoded palette mode information for the palette mode encoded block of video data (802). In some examples, the encoded palette mode information may include a plurality of instances of a first syntax element and a plurality of syntax elements that are different from the first syntax element. For example, the first syntax element may include palette_index_idc or palette_escape_val, and the plurality of syntax elements that are different from the first syntax element may include a palette_run_msb_id_plus1 syntax element. As another example, the first syntax element may be an indication of an index to an array of palette entries or the first syntax element may specify a quantized escape coded sample value for a color component corresponding to an escape sample. The plurality of syntax elements that are different from the first syntax element may include a syntax element that specifies an index of a most significant bit in a binary representation of a variable representing run length and a syntax element that specifies a run type mode.

As another example, the plurality of syntax elements that are different from the first syntax element may be any and all syntax elements that are different from the first syntax element. As described herein with respect to some examples, the plurality of syntax elements that are different from the first syntax element may also be different from second, third, and/or fourth syntax elements. In such examples, the plurality of syntax elements that are different from the first, second, third, and fourth syntax elements may be any and all syntax elements that are different from the first, second, third, and/or fourth syntax elements. In some examples, the plurality of syntax elements that are different from the first syntax element may be any and all syntax elements that are not bypass mode decoded and/or that are not to be bypass mode decoded.

Video decoder 30 may be configured to decode, using bypass mode, e.g., the bypass mode of a CABAC coding process, the plurality of instances of the first syntax element before decoding the plurality of syntax elements that are different from the first syntax element using context mode (804). Video decoder 30 may be configured to decode, using context mode, e.g., the regular CABAC mode (rather than the bypass mode), the plurality of syntax elements that are different from the first syntax element after decoding the plurality of instances of the first syntax element using bypass mode (806). In some examples, the plurality of instances of the first syntax element includes all instances of the first syntax element for the palette mode encoded block of video data. In such examples, all instances of the first syntax element are decoded using bypass mode before decoding any subsequent data, such as the plurality of syntax elements that are different from the first syntax element. Otherwise stated, video decoder 30 may be configured to decode, using context mode, the plurality of syntax elements that are different from the first syntax element after decoding all instances of the first syntax element for the palette mode encoded block of video data using bypass mode.

Video decoder 30 may be configured to decode the palette mode encoded block of video data using the decoded plurality of instances of the first syntax element and the decoded plurality of syntax elements that are different from the first syntax element (808). In some examples, the plurality of instances of the first syntax element are grouped together such that switching between bypass mode and context mode while decoding the palette mode encoded block of video data is reduced.

In some examples, the encoded palette mode information may include a second syntax element indicating a number of instances of the first syntax element (e.g., indicating how many instances of the first syntax element there are for the palette mode encoded block of video data). The plurality of syntax elements that are different from the first syntax element may also be different from the second syntax element. In such examples, video decoder 30 may be configured to decode, using bypass mode, the second syntax element before decoding the plurality of syntax elements that are different from the first syntax element and the second syntax element. In some examples, no instance of the second syntax element is interleaved between any two instances of the first syntax element for the palette mode encoded block of video data. In some examples, video decoder 30 may be configured to determine, after decoding a number of instances of the first syntax element equal to the number indicated by the second syntax element, that subsequent data in the encoded video bitstream following the number of instances of the first syntax element correspond to the plurality of syntax elements that are different from the first syntax element and the second syntax element. In some examples, video decoder 30 may be configured to decode the second syntax element using a concatenation of truncated Rice code and exponential Golomb code.

In some examples, the encoded palette mode information may include a third syntax element and a fourth syntax element. In such examples, video decoder 30 may be configured to decode the third syntax element to determine a value corresponding to the third syntax element indicative of whether the palette mode encoded block of video data includes an escape pixel. Video decoder 30 may be configured to decode the fourth syntax element to determine a value corresponding to the fourth syntax element indicative of palette size. Video decoder 30 may be configured to decode, based on the determined values respectively corresponding to the third and fourth syntax elements, the plurality of syntax elements that are different from the first syntax element and the second syntax element using context mode after decoding the plurality of instances of the first syntax element and the second syntax element using bypass mode.

In some examples, the encoded palette mode information may include another syntax element, and video decoder 30 may be configured to decode this other syntax element to determine a value corresponding to this other syntax element that specifies a number of distinct values that a palette index has for the palette mode encoded block of video data. Video decoder 30 may be configured to decode, based on the determined value corresponding to this other syntax element, the plurality of syntax elements that are different from the first syntax element and the second syntax element using context mode after decoding the plurality of instances of the first syntax element and the second syntax element using bypass mode.

In some examples, the encoded palette mode information may include another syntax element, and video decoder 30 may be configured to decode this other syntax element to determine a value corresponding to this other syntax element indicative of a last instance of a syntax element of palette_r-un_type_flag[xC][yC] for the palette mode encoded block of video data.

In some examples, video decoder 30 may be configured to determine the encoded block of video data has one or more escape samples. In such examples, video decoder 30 may be configured to decode a last escape sample in the encoded block of video data among the one or more escape samples. Video decoder 30 may be configured to infer an index value that applies to samples of the encoded block of video data following the last escape sample. Video decoder 30 may be configured to decode the samples of the encoded block of video data following the last escape sample using the inferred index value for each sample of the samples following the last escape sample.

In some examples, video decoder 30 may be configured to determine a number of palette indices received. In such examples, video decoder 30 may be configured to determine a number of palette indices left based on the number of palette indices received and the number of instances of the first syntax element. Video decoder 30 may be configured to determine a maximum possible run value for the encoded block of video data based on the number of palette indices received and the number of instances of the first syntax element. In some examples, video decoder 30 may be configured to determine the maximum possible run value for the encoded block of video data according to: nCbS*nCbS−scanPos−1−paletteIndicesLeft, where nCbS specifies a size of the encoded block of video data, scanPos specifies scan position, and paletteIndicesLeft specifies the number of palette indices left.

Figure 9:
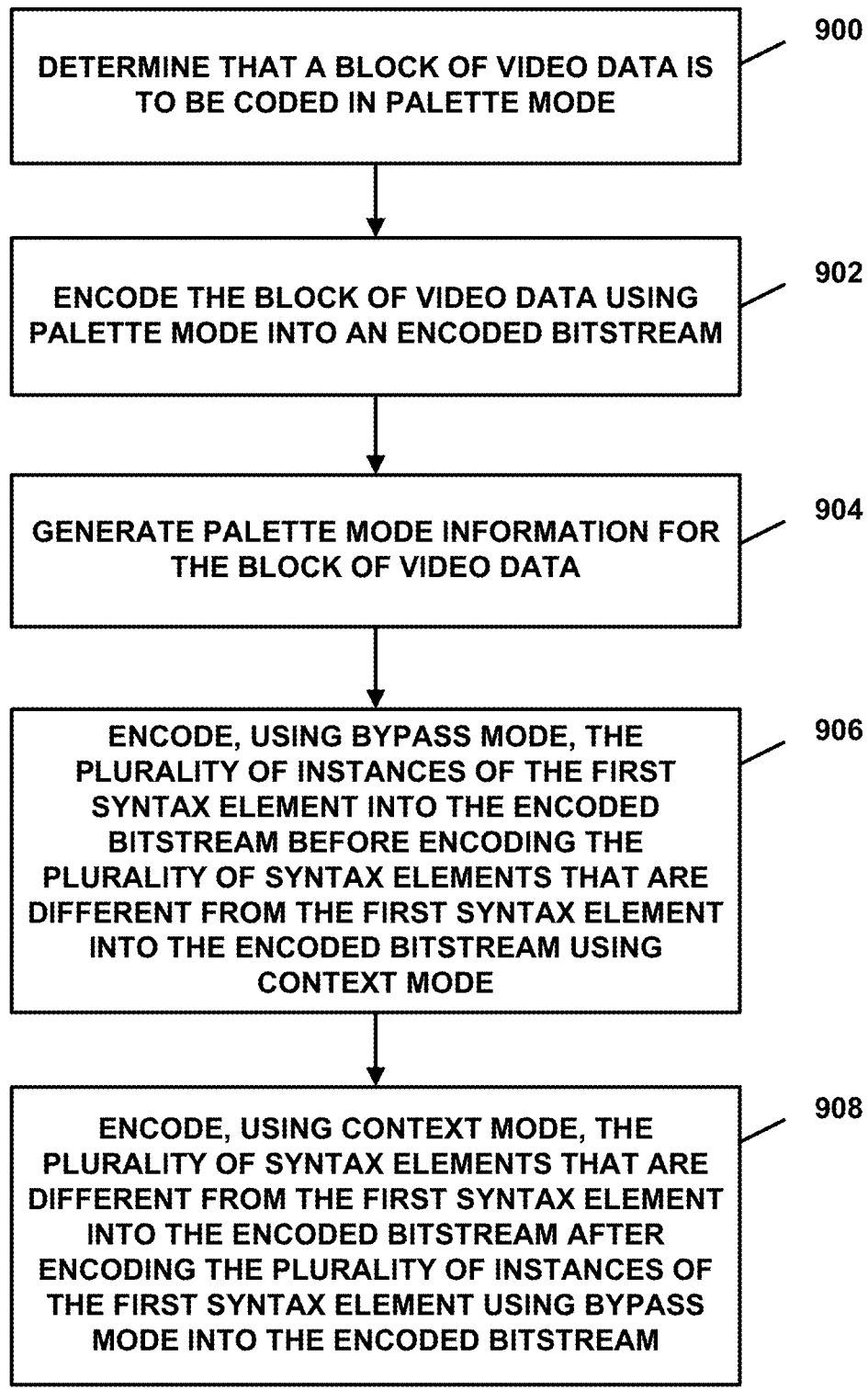
FIG. 9 is a flowchart illustrating an example process for encoding video data consistent with techniques for palette-based video coding of this disclosure.

FIG. 9 is a flowchart illustrating an example process for encoding video data consistent with techniques of this disclosure. The process of FIG. 9 is generally described as being performed by video encoder 20 for purposes of illustration, although a variety of other processors may also carry out the process shown in FIG. 9. In some examples, block encoding unit 100, palette-based encoding unit 122, and/or entropy encoding unit 118 may perform one or more processes shown in FIG. 9.

In the example of FIG. 9, video encoder 20 may be configured to determine that a block of video data is to be encoded in palette mode (900). Video encoder 20 may be configured to encode the block of video data using palette mode into an encoded bitstream (902). In some examples, video encoder 20 may be configured to generate palette mode information for the block of video data (904). The palette mode information may include a plurality of instances of a first syntax element and a plurality of syntax elements that are different from the first syntax element. For example, the first syntax element may include palette_index_idc or palette_escape_val, and the plurality of syntax elements that are different from the first syntax element may include a palette_run_msb_id_plus1 syntax element. As another example, the first syntax element may be an indication of an index to an array of palette entries or the first syntax element may specify a quantized escape coded sample value for a color component corresponding to an escape sample. The plurality of syntax elements that are different from the first syntax element may include a syntax element that specifies an index of a most significant bit in a binary representation of a variable representing run length and a syntax element that specifies a run type mode.

As another example, the plurality of syntax elements that are different from the first syntax element may be any and all syntax elements that are different from the first syntax element. As described herein with respect to some examples, the plurality of syntax elements that are different from the first syntax element may also be different from second, third, and/or fourth syntax elements. In such examples, the plurality of syntax elements that are different from the first, second, third, and fourth syntax elements may be any and all syntax elements that are different from the first, second, third, and/or fourth syntax elements. In some examples, the plurality of syntax elements that are different from the first syntax element may be any and all syntax elements that are not bypass mode encoded and/or that are not to be bypass mode encoded.

Video encoder 20 may be configured to encode, using bypass mode, e.g., the bypass mode of a CABAC coding process, the plurality of instances of the first syntax element into the encoded bitstream before encoding the plurality of syntax elements that are different from the first syntax element into the encoded bitstream using context mode (906). Video encoder 20 may be configured to encode, using context mode, e.g., the regular CABAC context-based mode, the plurality of syntax elements that are different from the first syntax element into the encoded bitstream after encoding the plurality of instances of the first syntax element using bypass mode into the encoded bitstream (908). In some examples, the plurality of instances of the first syntax element are grouped together such that switching between bypass mode and context mode while encoding the palette mode encoded block of video data is reduced.

In some examples, the plurality of instances of the first syntax element includes all instances of the first syntax element for the block of video data. In such examples, all instances of the first syntax element are encoded using bypass mode before encoding any subsequent data, such as the plurality of syntax elements that are different from the first syntax element. Otherwise stated, video encoder 20 may be configured to encode, using context mode, the plurality of syntax elements that are different from the first syntax element after encoding all instances of the first syntax element for the block of video data using bypass mode.

In some examples, the palette mode information may include a second syntax element indicating a number of instances of the first syntax element (e.g., indicating how many instances of the first syntax element there are for the block of video data). The plurality of syntax elements that are different from the first syntax element may also be different from the second syntax element. In such examples, video encoder 20 may be configured to encode, using bypass mode, the second syntax element into the encoded bitstream before the encoding of the plurality of syntax elements that are different from the first syntax element and the second syntax element. In some examples, video encoder 20 may be configured to encode the plurality of instances of the first syntax element such that no instance of the second syntax element is interleaved between any two instances of the first syntax element for the palette mode encoded block of video data in the encoded bitstream. In some examples, video encoder 20 may be configured to encode the second syntax element into the encoded bitstream after the encoded plurality of instances of the first syntax element in the encoded bitstream. For example, video encoder 20 may be configured to first encode all instances of the first syntax element, and then encode the second syntax element into the encoded bitstream. In some examples, video encoder 20 may be configured to encode the second syntax element using a concatenation of truncated Rice code and exponential Golomb code.

In some examples, the palette mode information may include a third syntax element and a fourth syntax element. In such examples, video encoder 20 may be configured to encode a value corresponding to the third syntax element indicative of whether the block of video data includes an escape pixel into the encoded bitstream. Video encoder 20 may be configured to a value corresponding to the fourth syntax element indicative of palette size into the encoded bitstream. In some examples, the palette mode information may include another syntax element, and video encoder 20 may be configured to encode a value corresponding to this other syntax element that specifies a number of distinct values that a palette index has for the block of video data into the encoded bitstream.

In some examples, the encoded palette mode information may include another syntax element, and video encoder 20 may be configured to encode a value corresponding to this other syntax element indicative of a last instance of a syntax element of palette_run_type_flag[xC][yC] for the block of video data.

In some examples, video encoder 20 may be configured to encode a last escape sample in the block of video data among the one or more escape samples. In such examples, video encoder 20 may be configured to infer an index value that applies to samples of the block of video data following the last escape sample. Video encoder 20 may be configured to encode the samples of the block of video data following the last escape sample using the inferred index value for each sample of the samples following the last escape sample.

It should be understood that all of the techniques described herein may be used individually or in combination. For example, video encoder 20 and/or one or more components thereof and video decoder 30 and/or one or more components thereof may perform the techniques described in this disclosure in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described herein. Any combination of the described systems, operations, functions, or examples is contemplated. These and other examples are within the scope of the following claims.

What is claimed is:

1. A method of decoding video data, the method comprising:

receiving, from an encoded video bitstream, a palette mode encoded block of video data of a picture;

receiving, from the encoded video bitstream, encoded palette mode information for the palette mode encoded block of video data, wherein the encoded palette mode information includes a plurality of instances of a first syntax element and a plurality of syntax elements that are different from the first syntax element, wherein the first syntax element is an indication of an index to an array of palette entries or specifies a quantized escape coded sample value for a color component corresponding to an escape sample, and wherein the plurality of syntax elements that are different from the first syntax element includes a syntax element that specifies an index of a most significant bit in a binary representation of a variable representing run length and a syntax element that specifies a run type mode;

parsing the plurality of instances of the first syntax element from the encoded video bitstream before parsing the plurality of syntax elements that are different from the first syntax element from the encoded video bitstream;

parsing the plurality of syntax elements that are different from the first syntax element from the encoded video bitstream after parsing the plurality of instances of the first syntax element from the encoded video bitstream;

decoding, using a context-based adaptive binary arithmetic coding bypass mode, the plurality of instances of the first syntax element;

decoding, using a context-based adaptive binary arithmetic coding context mode, the plurality of syntax elements that are different from the first syntax element; and decoding the palette mode encoded block of video data using the decoded plurality of instances of the first syntax element and the decoded plurality of syntax elements that are different from the first syntax element.

2. The method of claim 1, wherein the plurality of instances of the first syntax element includes all instances of the first syntax element for the palette mode encoded block of video data.

3. The method of claim 1, wherein the first syntax element is either a palette_index_idc syntax element that represents an index of a respective palette entry of the palette or a palette_escape_val syntax element that represents a reserved index value for escape samples that are represented by color information not represented by any of the palette entries of the palette, and wherein the plurality of syntax elements that are different from the first syntax element includes a palette_run_msb_id_plus1 syntax element indicative of a run length of a subset of the palette indices of the palette.

4. The method of claim 1, wherein the plurality of instances of the first syntax element are grouped together at a beginning of data representing the palette mode encoded block, such that switching from decoding using the bypass mode to decoding using the context mode occurs exactly once with respect to reconstructing the palette mode encoded block.

5. The method of claim 1, wherein the encoded palette mode information includes a second syntax element indicating a number of instances of the first syntax element in data representing the palette mode encoded block in the encoded video bitstream, wherein the plurality of syntax elements that are different from the first syntax element are also different from the second syntax element, and wherein the method further comprises:
parsing the second syntax element from the encoded video bitstream before parsing the plurality of syntax elements that are different from the first syntax element and the second syntax element from the encoded video bitstream; and
decoding, using the context-based adaptive binary arithmetic coding bypass mode, the second syntax element.

6. The method of claim 5, wherein no instance of the second syntax element is interleaved between any two instances of the first syntax element for the palette mode encoded block of video data.

7. The method of claim 5, further comprising:
determining, after decoding a number of instances of the first syntax element equal to the number indicated by the second syntax element, that subsequent data in the encoded video bitstream following the number of instances of the first syntax element correspond to the plurality of syntax elements that are different from the first syntax element and the second syntax element.

8. The method of claim 5, wherein the encoded palette mode information includes a third syntax element and a fourth syntax element, wherein the method further comprises:
decoding the third syntax element to determine a value corresponding to the third syntax element indicative of whether the palette mode encoded block of video data includes an escape sample;
decoding the fourth syntax element to determine a value corresponding to the fourth syntax element indicative of palette size; and
decoding, based on the determined values respectively corresponding to the third and fourth syntax elements, the plurality of syntax elements that are different from the first syntax element and the second syntax element using the context-based adaptive binary arithmetic coding context mode.

9. The method of claim 5, wherein the encoded palette mode information includes a third syntax element, wherein the method further comprises:
decoding the third syntax element to determine a value corresponding to the third syntax element that specifies a number of distinct values that a palette index has for the palette mode encoded block of video data; and
decoding, based on the determined value corresponding to the third syntax element, the plurality of syntax elements that are different from the first syntax element and the second syntax element using the context-based adaptive binary arithmetic coding context mode.

10. The method of claim 5, wherein the encoded palette mode information includes a third syntax element, wherein the method further comprises:
decoding the third syntax element to determine a value corresponding to the third syntax element indicative of a last instance of a syntax element of palette_run_type_flag[xC][yC] for the palette mode encoded block of video data.

11. The method of claim 5, further comprising:
decoding the second syntax element using a concatenation of truncated Rice code and exponential Golomb code.

12. The method of claim 5, further comprising:
determining a number of palette indices received;
determining a number of palette indices left, based on the number of palette indices received and the number of instances of the first syntax element; and
determining that a value for the variable representing run length is equal to a maximum possible run value for the palette mode encoded block of video data based on the number of palette indices received and the number of instances of the first syntax element.

13. The method of claim 12,
wherein the maximum possible run value for the palette mode encoded block of video data is equal to: nCbS*nCbS−scanPos−1−paletteIndicesLeft, wherein nCbS specifies a size of the palette mode encoded block of video data, wherein scanPos specifies a scan position, and wherein paletteIndicesLeft specifies the number of the palette indices left.

14. The method of claim 1, further comprising:
determining that the palette mode encoded block of video data has one or more escape samples;
decoding a last escape sample in the palette mode encoded block of video data among the one or more escape samples;
inferring an index value that applies to samples of the palette mode encoded block of video data following the last escape sample; and
decoding the samples of the palette mode encoded block of video data following the last escape sample using the inferred index value for each sample of the samples following the last escape sample.

15. A device for decoding video data, the device comprising:
a memory configured to store the video data; and
a video decoder in communication with the memory, the video decoder configured to:
receive a palette mode encoded block of video data of a picture from the memory;
receive encoded palette mode information for the palette mode encoded block of video data, wherein the encoded palette mode information includes a plurality of instances of a first syntax element and a plurality of syntax elements that are different from the first syntax element, wherein the first syntax element is an indication of an index to an array of palette entries or specifies a quantized escape coded sample value for a color component corresponding to an escape sample, and wherein the plurality of syntax elements that are different from the first syntax element includes a syntax element that specifies an index of a most significant bit in a binary representation of a variable representing run length and a syntax element that specifies a run type mode;

parse the plurality of instances of the first syntax element from the encoded palette mode information before parsing the plurality of syntax elements that are different from the first syntax element from the encoded palette mode information;

parse the plurality of syntax elements that are different from the first syntax element from the encoded palette mode information after parsing the plurality of instances of the first syntax element from the encoded palette mode information;

decode, using a context-based adaptive binary arithmetic coding bypass mode, the plurality of instances of the first syntax element;

decode, using a context-based adaptive binary arithmetic coding context mode, the plurality of syntax elements that are different from the first syntax element; and decode the palette mode encoded block of video data using the decoded plurality of instances of the first syntax element and the decoded plurality of syntax elements that are different from the first syntax element.

16. The device of claim 15, wherein the plurality of instances of the first syntax element includes all instances of the first syntax element for the palette mode encoded block of video data.

17. The device of claim 15, wherein the first syntax element is palette_index_idc or palette_escape_val, and wherein the plurality of syntax elements that are different from the first syntax element includes a palette_run_msb_id_plus1 syntax element.

18. The device of claim 15, wherein the plurality of instances of the first syntax element are grouped together such that switching between the context-based adaptive binary arithmetic coding bypass mode and the context-based adaptive binary arithmetic coding context mode while decoding the palette mode encoded block of video data is reduced.

19. The device of claim 15, wherein the encoded palette mode information includes a second syntax element indicating a number of instances of the first syntax element, wherein the plurality of syntax elements that are different from the first syntax element are also different from the second syntax element, and wherein the video decoder is further configured to:

parse the second syntax element from the encoded palette mode information before parsing the plurality of syntax elements that are different from the first syntax element and the second syntax element from the encoded palette mode information; and decode, using the context-based adaptive binary arithmetic coding bypass mode, the second syntax element.

20. The device of claim 19, wherein no instance of the second syntax element is interleaved between any two instances of the first syntax element for the palette mode encoded block of video data.

21. The device of claim 19, wherein the video decoder is further configured to determine, after decoding a number of instances of the first syntax element equal to the number indicated by the second syntax element, that subsequent data in the encoded video bitstream following the number of instances of the first syntax element correspond to the plurality of syntax elements that are different from the first syntax element and the second syntax element.

22. The device of claim 19, wherein the encoded palette mode information includes a third syntax element and a fourth syntax element, wherein the video decoder is further configured to:

decode the third syntax element to determine a value corresponding to the third syntax element indicative of whether the palette mode encoded block of video data includes an escape sample;

decode the fourth syntax element to determine a value corresponding to the fourth syntax element indicative of palette size; and decode, based on the determined values respectively corresponding to the third and fourth syntax elements, the plurality of syntax elements that are different from the first syntax element and the second syntax element using the context-based adaptive binary arithmetic coding context mode.

23. The device of claim 19, wherein the encoded palette mode information includes a third syntax element, wherein the video decoder is further configured to:

decode the third syntax element to determine a value corresponding to the third syntax element that specifies a number of distinct values that a palette index has for the palette mode encoded block of video data; and decode, based on the determined value corresponding to the third syntax element, the plurality of syntax elements that are different from the first syntax element and the second syntax element using the context-based adaptive binary arithmetic coding context mode.

24. The device of claim 19, wherein the encoded palette mode information includes a third syntax element, wherein the video decoder is further configured to:

decode the third syntax element to determine a value corresponding to the third syntax element indicative of a last instance of a syntax element of palette_run_type_flag[xC][yC] for the palette mode encoded block of video data.

25. The device of claim 19, wherein the video decoder is further configured to:

decode the second syntax element using a concatenation of truncated Rice code and exponential Golomb code.

26. The device of claim 19, wherein the video decoder is further configured to:

determine a number of palette indices received;

determine a number of palette indices left based on the number of palette indices received and the number of instances of the first syntax element; and determine that a value for the variable representing run length is equal to a maximum possible run value for the palette mode encoded block of video data based on the number of palette indices received and the number of instances of the first syntax element.

27. The device of claim 26, wherein the maximum possible run value for the palette mode encoded block of video data is equal to: nCbS*nCbS−scanPos−1−paletteIndicesLeft, wherein nCbS specifies a size of the palette mode encoded block of video data, scanPos specifies scan position, and paletteIndicesLeft specifies the number of palette indices left.

28. The device of claim 15, wherein the video decoder is further configured to:

determine that the palette mode encoded block of video data has one or more escape samples;

decode a last escape sample in the palette mode encoded block of video data among the one or more escape samples;

infer an index value that applies to samples of the palette mode encoded block of video data following the last escape sample; and decode the samples of the palette mode encoded block of video data following the last escape sample using the inferred index value for each sample of the samples following the last escape sample.

29. A non-transitory computer-readable storage medium having instructions stored thereon that, when executed, cause one or more processors to:

receive a palette mode encoded block of video data of a picture from a memory;

receive encoded palette mode information for the palette mode encoded block of video data, wherein the encoded palette mode information includes a plurality of instances of a first syntax element and a plurality of syntax elements that are different from the first syntax element, wherein the first syntax element is an indication of an index to an array of palette entries or specifies a quantized escape coded sample value for a color component corresponding to an escape sample, and wherein the plurality of syntax elements that are different from the first syntax element includes a syntax element that specifies an index of a most significant bit in a binary representation of a variable representing run length and a syntax element that specifies a run type mode;

parse the plurality of instances of the first syntax element from the encoded palette mode information before parsing the plurality of syntax elements that are different from the first syntax element from the encoded palette mode information;

parse the plurality of syntax elements that are different from the first syntax element from the encoded palette mode information after parsing the plurality of instances of the first syntax element from the encoded palette mode information;

decode, using a context-based adaptive binary arithmetic coding bypass mode, the plurality of instances of the first syntax element;

decode, using a context-based adaptive binary arithmetic coding context mode, the plurality of syntax elements that are different from the first syntax element; and decode the palette mode encoded block of video data using the decoded plurality of instances of the first syntax element and the decoded plurality of syntax elements that are different from the first syntax element.

30. A method of encoding video data, the method comprising:

determining that a block of video data is to be coded in palette mode;

encoding the block of video data using palette mode into an encoded bitstream, wherein encoding the block of video data using palette mode comprises:

generating palette mode information for the block of video data, wherein the palette mode information includes a plurality of instances of a first syntax element and a plurality of syntax elements that are different from the first syntax element, wherein the first syntax element is an indication of an index to an array of palette entries or specifies a quantized escape coded sample value for a color component corresponding to an escape sample, and wherein the plurality of syntax elements that are different from the first syntax element includes a syntax element that specifies an index of a most significant bit in a binary representation of a variable representing run length and a syntax element that specifies a run type mode;

encoding, using a context-based adaptive binary arithmetic coding bypass mode, the plurality of instances of the first syntax element into the encoded bitstream before encoding the plurality of syntax elements that are different from the first syntax element into the encoded bitstream using a context-based adaptive binary arithmetic coding context mode; and encoding, using the context-based adaptive binary arithmetic coding context mode, the plurality of syntax elements that are different from the first syntax element into the encoded bitstream after encoding the plurality of instances of the first syntax element using the context-based adaptive binary arithmetic coding bypass mode into the encoded bitstream.

31. The method of claim 30, wherein the plurality of instances of the first syntax element includes all instances of the first syntax element for the block of video data.

32. The method of claim 30 wherein the first syntax element is palette_index_idc or palette_escape_val, and wherein the plurality of syntax elements that are different from the first syntax element includes a palette_run_msb_id_plus1 syntax element.

33. The method of claim 30, wherein the plurality of instances of the first syntax element are grouped together such that switching between the context-based adaptive binary arithmetic coding bypass mode and the context-based adaptive binary arithmetic coding context mode while encoding the palette mode encoded block of video data is reduced.

34. The method of claim 30, wherein the palette mode information includes a second syntax element indicating a number of instances of the first syntax element, wherein the plurality of syntax elements that are different from the first syntax element are different from the second syntax element, and wherein the method further comprises:

encoding, using the context-based adaptive binary arithmetic coding bypass mode, the second syntax element into the encoded bitstream before the encoding of the plurality of syntax elements that are different from the first syntax element and the second syntax element.

35. The method of claim 34, wherein no instance of the second syntax element is interleaved between any two instances of the first syntax element for the block of video data.

36. The method of claim 34, further comprising:

encoding the second syntax element into the encoded bitstream after the encoded plurality of instances of the first syntax element in the encoded bitstream.

37. The method of claim 34, wherein the palette mode information includes a third syntax element and a fourth syntax element, wherein the method further comprises:

encoding a value corresponding to the third syntax element indicative of whether the block of video data includes an escape sample into the encoded bitstream; and encoding a value corresponding to the fourth syntax element indicative of palette size into the encoded bitstream.

38. The method of claim 34, wherein the palette mode information includes a third syntax element, wherein the method further comprises:

encoding a value corresponding to the third syntax element that specifies a number of distinct values that a palette index has for the block of video data into the encoded bitstream.

39. The method of claim 34, wherein the palette mode information includes a third syntax element, wherein the method further comprises:
encoding a value corresponding to the third syntax element indicative of a last instance of a syntax element of palette_run_type_flag[xC][yC] for the block of video data.

40. The method of claim 34, further comprising:
encoding the second syntax element using a concatenation of truncated Rice code and exponential Golomb code.

41. The method of claim 30, further comprising:
encoding a last escape sample in the block of video data among the one or more escape samples;
inferring an index value that applies to samples of the block of video data following the last escape sample; and
encoding the samples of the block of video data following the last escape sample using the inferred index value for each sample of the samples following the last escape sample.

42. A device for encoding video data, the device comprising:
a memory configured to store the video data; and
a video encoder in communication with the memory, the video encoder configured to:
determine that a block of video data stored in the memory is to be encoded in palette mode;
encode the block of video data using palette mode into an encoded bitstream, wherein the video encoder being configured to encode the block of video data using palette mode comprises the video encoder being configured to:
generate palette mode information for the block of video data, wherein the palette mode information includes a plurality of instances of a first syntax element and a plurality of syntax elements that are different from the first syntax element, wherein the first syntax element is an indication of an index to an array of palette entries or specifies a quantized escape coded sample value for a color component corresponding to an escape sample, and wherein the plurality of syntax elements that are different from the first syntax element includes a syntax element that specifies an index of a most significant bit in a binary representation of a variable representing run length and a syntax element that specifies a run type mode;
encode, using a context-based adaptive binary arithmetic coding bypass mode, the plurality of instances of the first syntax element into the encoded bitstream before encoding the plurality of syntax elements that are different from the first syntax element into the encoded bitstream using a context-based adaptive binary arithmetic coding context mode; and
encode, using the context-based adaptive binary arithmetic coding context mode, the plurality of syntax elements that are different from the first syntax element into the encoded bitstream after encoding the plurality of instances of the first syntax element using the context-based adaptive binary arithmetic coding bypass mode into the encoded bitstream.

* * * * *